(12) United States Patent
Kurita et al.

(10) Patent No.: US 7,359,180 B2
(45) Date of Patent: Apr. 15, 2008

(54) SOLID-STATE ELECTROLYTIC CAPACITOR AND MANUFACTURING METHOD THEREOF

(75) Inventors: Junichi Kurita, Osaka (JP); Kazuo Tadanobu, Kyoto (JP); Kenji Kuranuki, Kyoto (JP); Yuji Midou, Osaka (JP); Tsuyoshi Yoshino, Kyoto (JP); Tatsuo Fujii, Osaka (JP); Hiroshi Serikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 298 days.

(21) Appl. No.: 10/595,080
(22) PCT Filed: Apr. 11, 2005
(86) PCT No.: PCT/JP2005/007007
§ 371 (c)(1),
(2), (4) Date: Feb. 1, 2006
(87) PCT Pub. No.: WO2005/104150
PCT Pub. Date: Nov. 3, 2005

(65) Prior Publication Data
US 2007/0109724 A1 May 17, 2007

(30) Foreign Application Priority Data
Apr. 26, 2004 (JP) .............................. 2004-129289
Jun. 16, 2004 (JP) .............................. 2004-177861
Aug. 25, 2004 (JP) .............................. 2004-245573

(51) Int. Cl.
H01G 9/04 (2006.01)
(52) U.S. Cl. ........................ 361/528; 361/523; 361/525; 361/516; 361/519; 361/529; 361/540; 29/25.01; 29/25.03
(58) Field of Classification Search ................ 361/528, 361/523, 525, 529, 516–519, 534, 541, 507, 361/509; 29/25.01, 25.03
See application file for complete search history.

(56) References Cited
U.S. PATENT DOCUMENTS
5,424,907 A * 6/1995 Kojima et al. ............... 361/532
6,462,936 B1 * 10/2002 Fujimoto et al. ........... 361/525
(Continued)

FOREIGN PATENT DOCUMENTS
JP 2000/340463 A 12/2000
JP 2001/110676 A 4/2001
JP 2003/45753 A 2/2003

OTHER PUBLICATIONS
International Search Report of PCT/JP05/007007.

Primary Examiner—Nguyen T. Ha
(74) Attorney, Agent, or Firm—McDermott Will & Emery LLP

(57) ABSTRACT

A solid electrolytic capacitor includes a flat-shaped anode terminal having a first surface connected to an anode portion of a capacitor element and having a second surface opposite to the first surface, a flat-shaped cathode terminal having a first surface connected to a cathode layer of the capacitor element and having a second surface opposite to the first surface thereof, and an insulating resin package accommodating the capacitor element, the anode terminal, and the cathode terminal. The second surface of the cathode terminal is flush with the second surface of the anode terminal. The second surface of the anode terminal and the second surface of the cathode terminal expose to an outside of the resin package. The anode terminal includes a first thick portion and a first thin portion thinner than the first thick portion. The first thick portion has the second surface of the anode terminal and a portion of the first surface of the anode terminal. The first thin portion has a portion of the first surface of the anode terminal and being connected to the first thick portion. The cathode terminal includes a second thick portion and a second thin portion thinner than the second thick portion. The second thick portion has the second surface of the cathode terminal and a portion of the first surface of the cathode terminal. The second thin portion has a portion of the first surface and being connected to the second thick portion. This solid electrolytic capacitor has a small equivalent series inductance, and is stably mountable to a mount body.

37 Claims, 39 Drawing Sheets

U.S. PATENT DOCUMENTS

| | | | |
|---|---|---|---|
| 6,552,896 B1* | 4/2003 | Igaki et al. | 361/523 |
| 6,882,519 B2* | 4/2005 | Uzawa et al. | 361/523 |
| 6,912,117 B2* | 6/2005 | Arai et al. | 361/523 |
| 7,135,754 B2* | 11/2006 | Sano et al. | 257/528 |
| 7,139,163 B2* | 11/2006 | Sawano | 361/540 |
| 7,158,366 B2* | 1/2007 | Kobayashi et al. | 361/523 |

* cited by examiner

US 7,359,180 B2

SOLID-STATE ELECTROLYTIC CAPACITOR AND MANUFACTURING METHOD THEREOF

THIS APPLICATION IS A U.S. NATIONAL PHASE APPLICATION OF PCT INTERNATIONAL APPLICATION PCT/JP2005/007007, filed Apr. 11, 2005

TECHNICAL FIELD

The present invention relates to a solid electrolytic capacitor including solid electrolyte made of conductive polymer for use in various electronic devices, and to a method of manufacturing the capacitor.

BACKGROUND ART

According to high-frequency operations of electronic apparatuses, capacitors used in the apparatuses have been required to have excellent impedance characteristics in high frequencies. For this requirement, solid electrolytic capacitors including solid electrolytes made of conductive polymer having large conductivities.

FIG. 22 is a perspective view of conventional solid electrolytic capacitor 1100 disclosed in Japanese Patent Laid-Open Publication No. 2000-340463. FIG. 23 is a perspective view of capacitor 1100. FIG. 24 is a perspective view of capacitor element 1030 of capacitor 1100.

As shown in FIG. 24, in capacitor element 1030, a surface of anode body 1031 made of valve metal, such as aluminum foil, is anodized to provide a dielectric oxide layer, and is divided into cathode portion 1034 and anode portion 1033 with resist 1032 having an insulating property. Solid electrolyte layer 1035 is formed on a surface of cathode portion 1034. Cathode layer 1036 made of carbon and silver paste is formed on solid electrolyte layer 1035.

Anode portion 1033 of capacitor element 1030 is placed on a connecting surface of anode terminal 1037, and cathode layer 1036 is placed on a connecting surface of cathode terminal 1038. Connecting portions 1037A of the connecting surface of anode terminal 1037 are folded and joined to anode portion 1033 by resistance welding. Cathode layer 1036 is connected to the connecting surface of cathode terminal 1038 with conductive silver paste. Guides 1038A are formed by bending portions of the connecting surface of cathode terminal 1038.

Insulating resin package 1039 accommodates capacitor element 1030, anode terminal 1037 connected to the element, and cathode terminal 1038 connected to the element to allow anode terminal 1037 and cathode terminal 1038 to have respective portions exposing to the outside. The portions of anode terminal 1037 and cathode terminal 1038 exposing to the outside of resin package 1039 are bent along respective sides to the bottom of resin package 1039, thus providing outer terminals 1037B and 1038B, respectively.

In conventional solid electrolytic capacitor 1100, anode terminal 1037 and cathode terminal 1038 have complex structures, thus being a factor raising a cost. Further, anode terminal 1037 and cathode terminal 1038 have considerable lengths from anode portion 1033 and cathode portion 1034 of capacitor element 1030 to outer terminals 1037B and 1038B, thus providing solid electrolytic capacitor 1100 with a large equivalent series inductance (ESL) and a large equivalent series resistance (ESR). They prevent the capacitor from being used around a CPU of a personal computer, which requires a small ESL, a large noise suppressing performance, and an excellent transient response to deal with high frequencies.

SUMMARY OF THE INVENTION

A solid electrolytic capacitor includes a flat-shaped anode terminal having a first surface connected to an anode portion of a capacitor element and having a second surface opposite to the first surface, a flat-shaped cathode terminal having a first surface connected to a cathode layer of the capacitor element and having a second surface opposite to the first surface thereof, and an insulating resin package accommodating the capacitor element, the anode terminal, and the cathode terminal. The second surface of the cathode terminal is flush with the second surface of the anode terminal. The second surface of the anode terminal and the second surface of the cathode terminal expose to an outside of the resin package. The anode terminal includes a first thick portion and a first thin portion thinner than the first thick portion. The first thick portion has the second surface of the anode terminal and a portion of the first surface of the anode terminal. The first thin portion has a portion of the first surface of the anode terminal and being connected to the first thick portion. The cathode terminal includes a second thick portion and a second thin portion thinner than the second thick portion. The second thick portion has the second surface of the cathode terminal and a portion of the first surface of the cathode terminal. The second thin portion has a portion of the first surface and being connected to the second thick portion.

This solid electrolytic capacitor has a small equivalent series inductance, and is stably mountable to a mount body.

REFERENCE NUMERALS

Figure 1A:
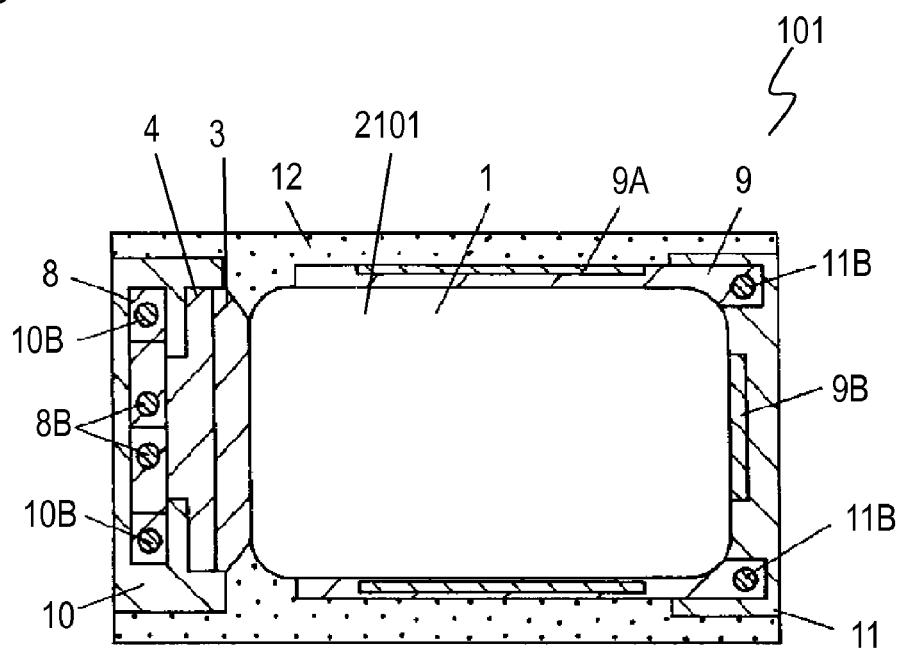
FIG. 1A is a plan view of a solid electrolytic capacitor according to Exemplary Embodiment 1 of the present invention.

1 Capacitor Element
2 Anode Body
3 Resist
4 Anode Portion
5 Cathode Portion
6 Solid Electrolyte Layer
7 Cathode Layer
8 Anode Lead Frame
8A Guide
8B Junction
9 Cathode Lead Frame
9A, 9B Guide 10 Anode Terminal
10A Thin Portion (First Thin Portion, Third Thin Portion)
10B Junction
10E Thick Portion (First Thick Portion)
11 Cathode Terminal
11A Thin Portion (Second Thin Portion, Third Thin Portion)
11B Junction
11E Thick Portion (Second Thick Portion)
12 Resin Package
501 Capacitor Element
502 Anode Body
503 Resist
504 Anode Portion
505 Cathode Portion
506 Solid Electrolyte Layer
507 Cathode Layer
508 Anode Lead Frame
508A Guide
508B Junction
509 Cathode Lead Frame
509A, 509B Guide
510 Anode Terminal
510A Thin Portion (First Thin Portion, Third Thin Portion)
510B Junction
510C Protruding Portion
510E Thick Portion (First Thick Portion)
511 Cathode Terminal
511A Thin Portion (Second Thin Portion, Third Thin Portion)
511E Thick Portion (Second Thick Portion)
512 Resin Package
514 Cathode Terminal
514A Thin Portion (Second Thin Portion, Third Thin Portion)
514C Seating Portion
514D Protruding Portion
514E Thick Portion (Second Thick Portion)
515 Anode Terminal
515A Thin Portion (First Thin Portion, Third Thin Portion)
515B Junction
515C Protruding Portion
515E Thick Portion (First Thick Portion)
516 Cathode Terminal
516A Thin Portion (Second Thin Portion, Third Thin Portion)
516C Seating Portion
516D Protruding Portion
516E Thick Portion (Second Thick Portion)
517 Cathode Terminal
517A Thin Portion (Second Thin Portion, Third Thin Portion)
517C Protruding Portion
517E Thick Portion (Second Thick Portion)
601 Capacitor Elements
602 Anode Body
603 Resist
604 Anode Portion
605 Cathode Portion
606 Solid Electrolyte Layer
607 Cathode Layers
608 Anode Lead Frame
608A Guide
608B Junction
609 Cathode Lead Frame
609A, 609B Guide
610 Anode Terminal
610A Thin Portion (First Thin Portion, Third Thin Portion)
610B Junction
610E Thick Portion (First Thick Portion)
611 Cathode Terminal
611A Thin Portion (Second Thin Portion, Third Thin Portion)
611B Junction
611E Thick Portion (Second Thick Portion)
612 Resin Package
612A Resin Package
612B, 612C Recess
614 Cathode Terminal
614A Thin Portion (Second Thin Portion, Third Thin Portion)
614C Seating Portion
614E Thick Portion (Second Thick Portion)
615 Cathode Terminal
615A Thin Portion (Second Thin Portion, Third Thin Portion)
615E Thick Portion (Second Thick Portion)
616 Anode Terminal
616A Thin Portion (First Thin Portion, Third Thin Portion)
616C Protruding Portion
616E Thick Portion (First Thick Portion)
617 Cathode Terminal
617A Thin Portion (Second Thin Portion, Third Thin Portion)
617C Protruding Portion
617E Thick Portion (Second Thick Portion)
618 Cathode Terminal
618A Thin Portion (Second Thin Portion, Third Thin Portion)
618C, 618D Protruding Portion
618E Thick Portion (Second Thick Portion)
619 Cathode Terminal
619A Thin Portion (Second Thin Portion, Third Thin Portion)
619C, 619D Protruding Portion
619E Thick Portion (Second Thick Portion)
620 Anode Terminal
620A Thin Portion (First Thin Portion, Third Thin Portion)
620C Protruding Portion
620E Thick Portion (First Thick Portion)
621 Cathode Terminal
621A Thin Portion (Second Thin Portion, Third Thin Portion)
621C Protruding Portion
621E Thick Portion (Second Thick Portion)
622 Cathode Terminal
622A Thin Portion (Second Thin Portion, Third Thin Portion)
622C, 622D Protruding Portion
622E Thick Portion (Second Thick Portion)
623 Cathode Terminal
623A Thin Portion (Second Thin Portion, Third Thin Portion)
623C, 623D Protruding Portion
623E Thick Portion (Second Thick Portion)
624 Cathode Terminal
624A Thin Portion (Second Thin Portion, Third Thin Portion)
624E Thick Portion (Second Thick Portion)
701 Mount Body

DETAILED DESCRIPTION OF THE PREFERRED EMBODIMENTS

Exemplary Embodiment 1

Figure 1B:
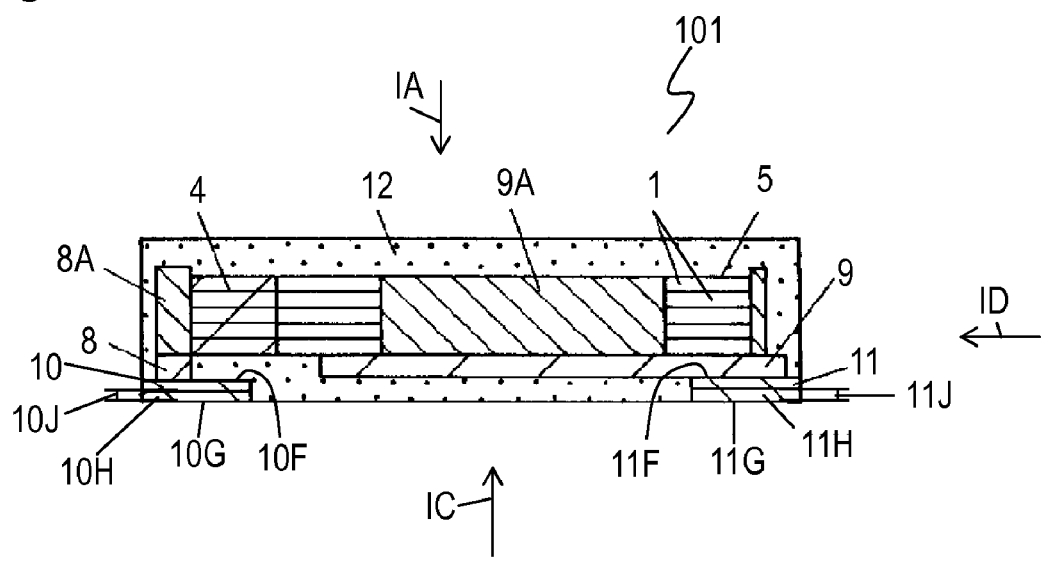
FIG. 1B is a front view of the solid electrolytic capacitor according to Embodiment 1.
Figure 1C:
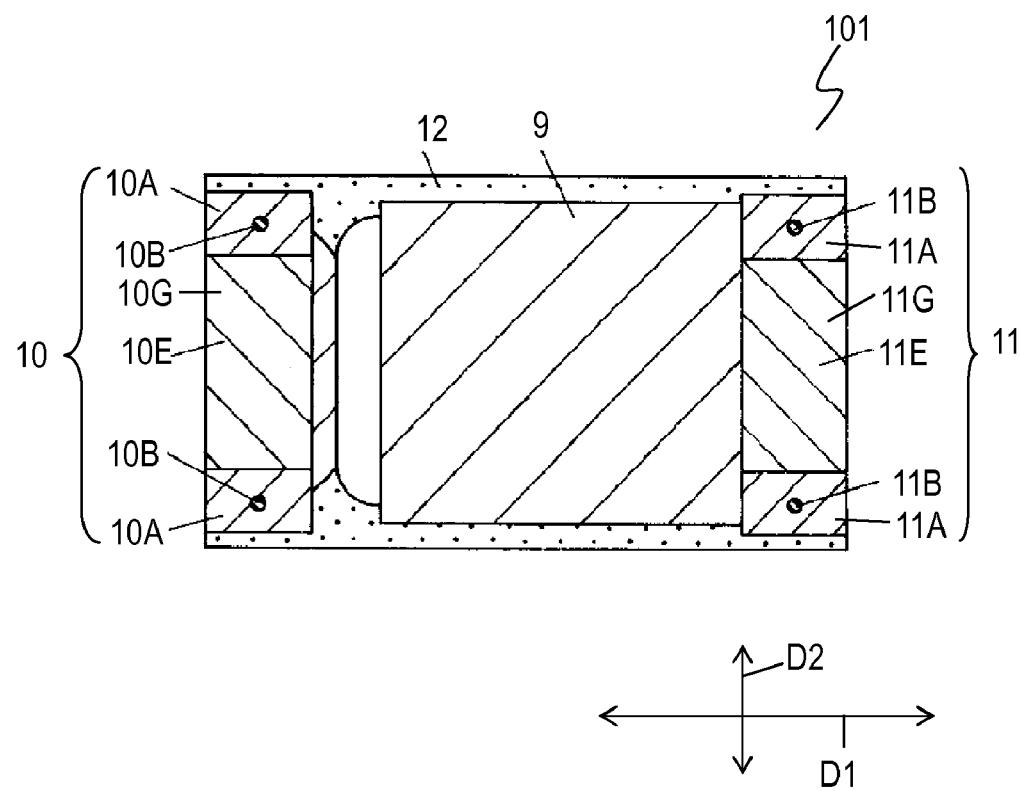
FIG. 1C is a bottom view of the solid electrolytic capacitor according to Embodiment 1.
Figure 1D:
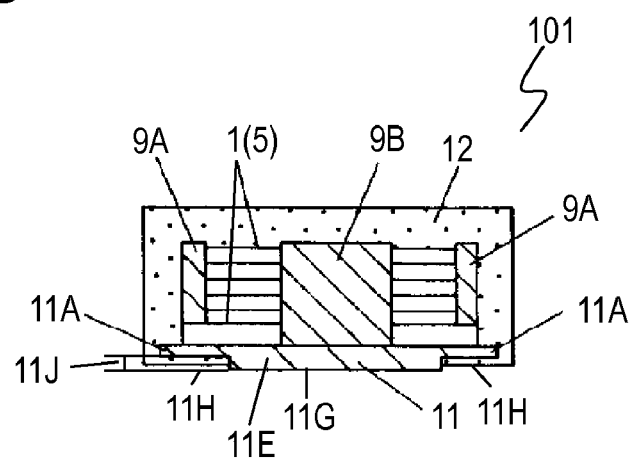
FIG. 1D is a side view of the solid electrolytic capacitor according to Embodiment 1.
Figure 1E:
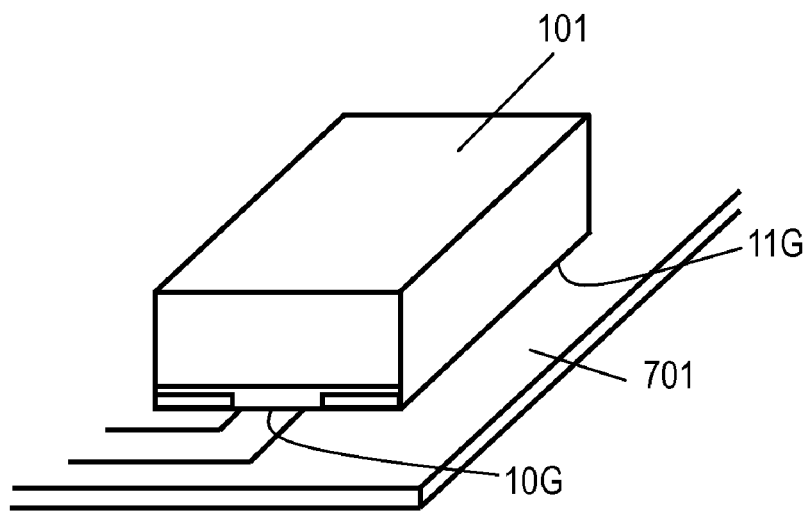
FIG. 1E is a perspective view of the solid electrolytic capacitor mounted to the mount body according to Embodiment 1.
Figure 2:
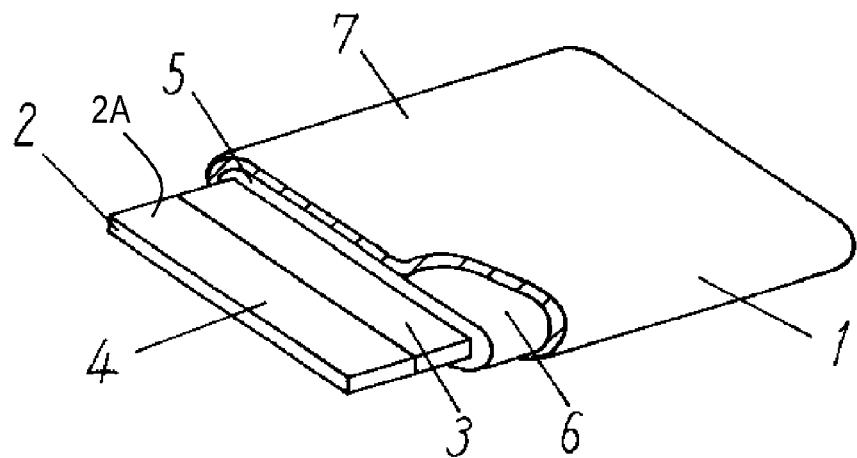
FIG. 2 is a perspective view of a capacitor element of the solid electrolytic capacitor according to Embodiment 1.

FIGS. 1A to 1D show solid electrolytic capacitor 101 according to Exemplary Embodiment 1 of the present invention. FIG. 1B is a front view of solid electrolytic capacitor 101. FIGS. 1A, 1C, and 1D are a plan view seen from direction IA, a bottom view seen from direction IC, and a side view seen from direction ID of solid electrolytic capacitor 101 shown in FIG. 1B, respectively. FIG. 2 is a perspective view of capacitor element 1 of solid electrolytic capacitor 101. FIG. 1E is a perspective view of solid electrolytic capacitor 101 mounted to mount body 701.

As shown in FIG. 2, capacitor element 1 has a substantially flat plate shape. A surface of anode body 2 made of valve metal, such as aluminum foil, is roughened and anodized, thus providing dielectric oxide layer 2A on the surface. Resist 3 having an insulating property is provided on dielectric oxide layer 2A, and divides anode body 2 into cathode portion 5 and anode portion 4. Solid electrolyte layer 6 made of conductive polymer is provided on dielectric oxide layer 2A of cathode portion 5, and cathode layer 7 made of carbon and silver paste is placed on solid electrolyte layer 6.

According to Embodiment 1, five capacitor elements 1 are stacked so that anode portion 4 of one of capacitor elements 1 is placed on anode lead frame 8. Guides 8A provided at both side ends of anode lead frame 8 are folded to wrap anode portions 4 of all of five capacitor elements 1, and are joined unitarily to anode portions 4 at junctions 8B by laser welding.

Cathode portions 5 of the five stacked capacitor elements 1 are placed over cathode lead frame 9 via a conductive adhesive. Five capacitor elements 1 are positioned and fixed with guides 9A at both side ends and guide 9B at a distal end of cathode lead frame 9, and are joined unitarily. Thus, plural capacitor elements 1, anode lead frame 8, and cathode lead frame 9 unitarily assembled, providing capacitor element unit 2101.

Anode terminal 10 has thick portion 10E at the center thereof and thin portions 10A. Thin portions 10A are thinner than thick portion 10E and are provided at both sides of thick portion 10E. Thin portions 10A are formed in anode terminal 10 by providing recesses 10H in surface 10G opposite to surface 10F facing capacitor elements 1. Surface 10F of anode terminal 10 including thick portion 10E and thin portions 10A is flat. Thin portions 10A have portions of surface 10F of anode terminal 10, and thick portion 10E has a portion of surface 10F. Anode lead frame 8 of capacitor element unit 2101 is placed on surface 10F of anode terminal 10, and is connected to anode terminal 10 at junctions 10B inside thin portions 10A by laser welding.

Cathode terminal 11 has thick portion 11E at the center thereof and thin portions 11A. Thin portions 11A are thinner than thick portion 11E and are connected at both sides of thick portion 11E. Thin portions 11A are formed in cathode terminal 11 by providing recesses 11H in surface 11G opposite to surface 11F facing capacitor elements 1. Surface 11F of cathode terminal 11 including thick portion 11E and thin portions 11A is flat. Thin portions 11A have portions of surface 11F of cathode terminal 11, and thick portion 11E has a portion of surface 11F. Cathode lead frame 9 of capacitor element unit 2101 is places on surface 11F of cathode terminal 11, and is connected to cathode terminal 11 at junctions 11B inside thin portions 11A by laser welding.

Thin portions 10A and 11A are arranged in direction D2 perpendicular to direction D1 in which anode terminal 10 and cathode terminal 11 are arranged. Thick portion 11E of cathode terminal 11 is provided between thin portions 11A.

Resin package 12 having an insulating property accommodates capacitor element unit 2101 therein to allow surfaces 10G and 11G of anode terminal 10 and cathode terminal 11 to expose to the outside. According to Embodiment 1, resin package 12 is made of epoxy resin. Capacitor 101 is mounted to mount body 701, such as a wiring board, as shown in FIG. 1E. In this case, surfaces 10G and 11G function as mounting surfaces.

Figure 3A:
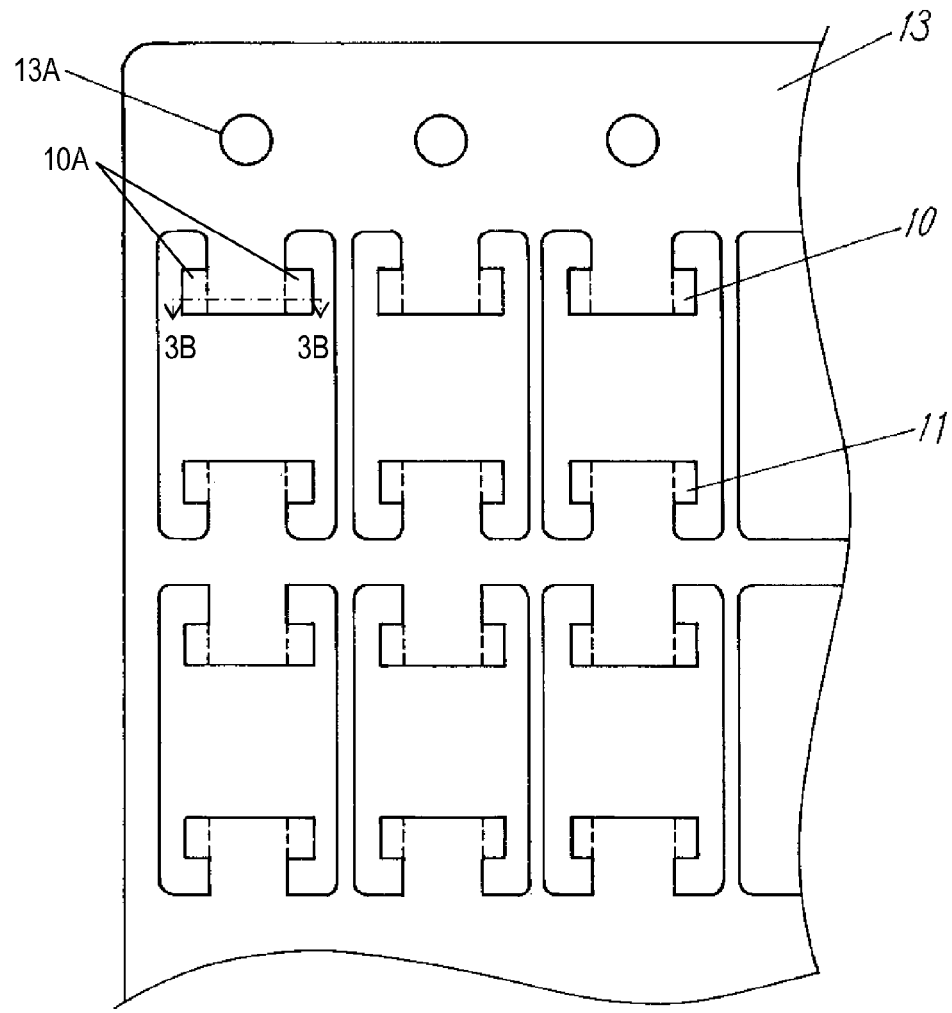
FIG. 3A is a plan view of a substrate used for manufacturing the solid electrolytic capacitor according to Embodiment 1.
Figure 3B:
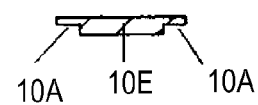
FIG. 3B is a cross sectional view of the substrate at line 3B-3B shown in FIG. 3A.

FIG. 3A is a plan view of substrate 13 having a hoop shape for providing plural anode terminals 10 and cathode terminals 11. FIG. 3B is a cross sectional view of substrate 13 at line 3B-3B shown in FIG. 3A. Substrate 13 is made of copper alloy, and has feed holes 13A formed therein for intermittent feeding. The anode terminals 10 and cathode terminals 11 are formed consecutively in substrate 13 at predetermined intervals. Plural capacitor element units 2101 are joined onto respective ones of anode terminals 10 and cathode terminals 11 and are accommodated in resin packages 12 having an insulating property, respectively. Then, anode terminals 10 and cathode terminals 11 are removed from substrate 13, thus providing plural chip capacitors 101.

Substrate 13 having anode terminals 10 and cathode terminals 11 formed therein is formed by etching a metal plate. The etching removes unnecessary portions and thins the both sides of anode terminals 10 and cathode terminals 11, thus providing thin portions 10A and 11A simultaneously. Thickness difference 10J between thin portions 10A and thick portion 10E and thickness difference 11J between thin portions 11A and thick portion 11E are determined to be not less than 80 µm. This dimension of each of differences 10J and 11J is necessary for allowing insulating resin package 12 to flow and sufficiently fill recesses 10H and 11H when capacitor element unit 2101 is accommodated. The dimension of differences 10J and 11J may be increased to such an extent that terminals 10A and 11A do not function as connecting terminals.

Figure 22:
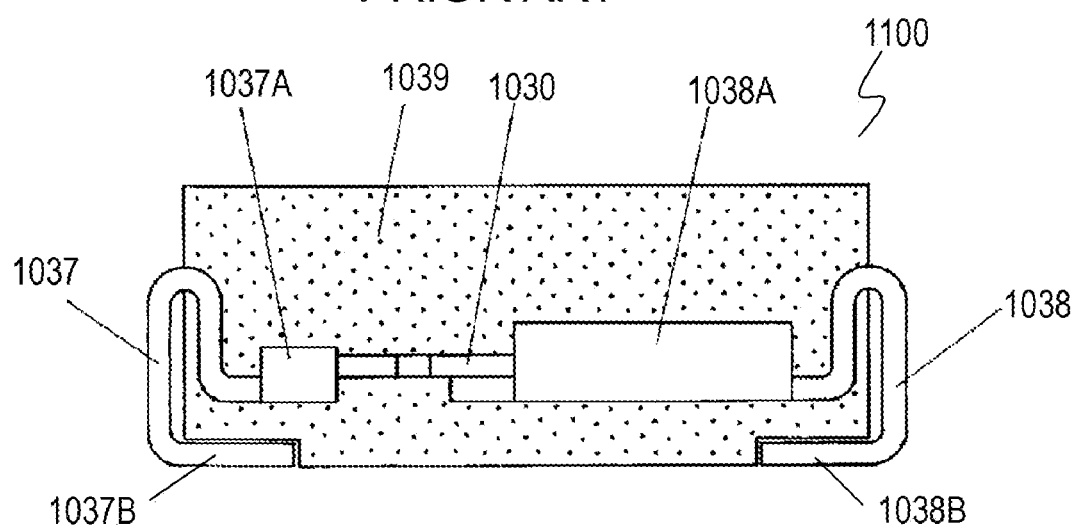
FIG. 22 is a view of a conventional solid electrolytic capacitor.
Figure 23:
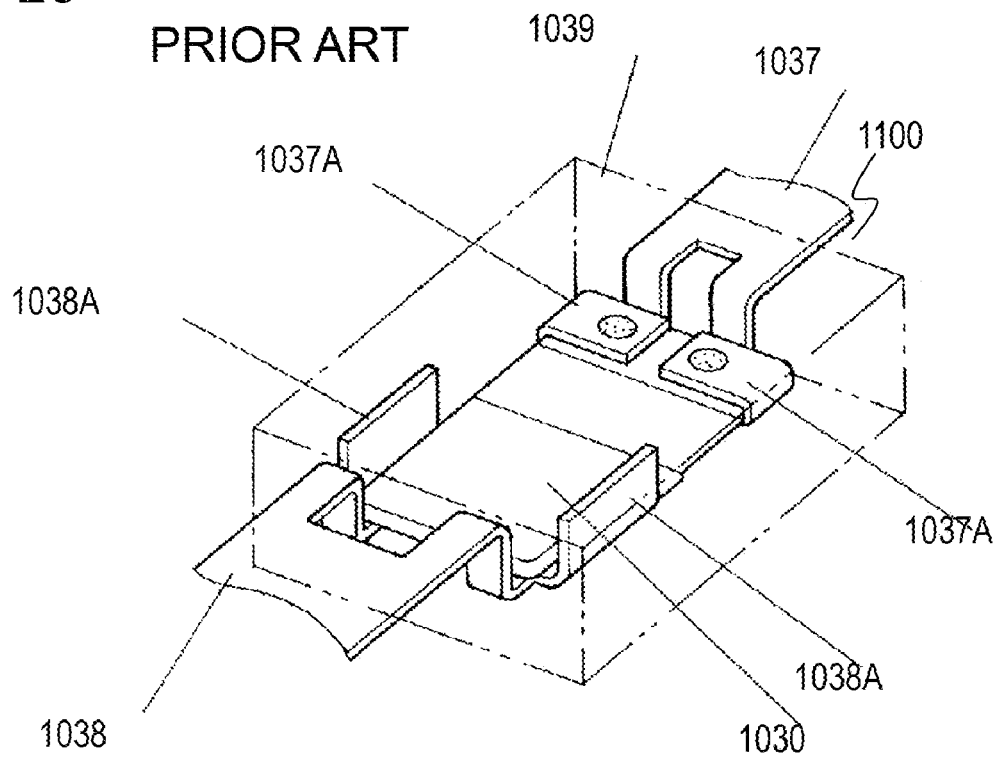
FIG. 23 is a perspective view of the conventional solid electrolytic capacitor.
Figure 24:
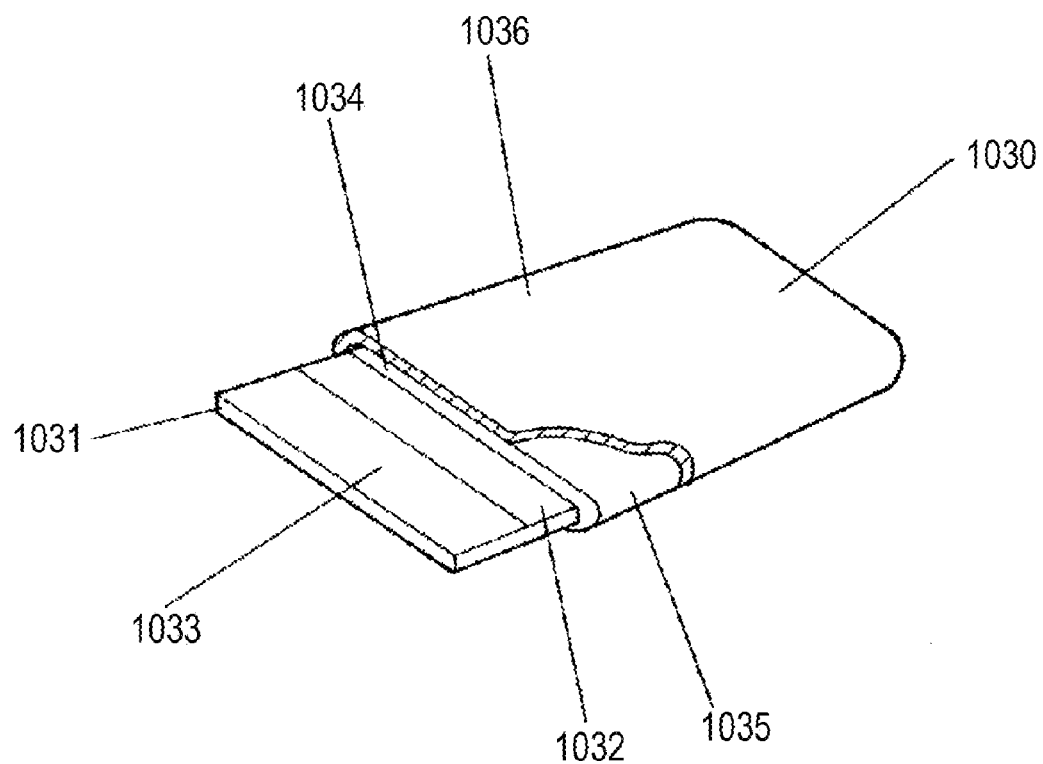
FIG. 24 is a perspective view of a capacitor element of the conventional solid electrolytic capacitor.

Solid electrolytic capacitor 101 according to Embodiment 1 allows anode portion 4 and cathode portion 5 of capacitor element 1 to be drawn out to the outside in a short distance through anode terminal 10 and cathode terminal 11 having flat plate shapes, thereby having a small equivalent series resistance (ESR) and a small equivalent series inductance (ESL). The ESL of solid electrolytic capacitor 101 was 800 pH, which was approximately a half of an ESL of 1500 pH of conventional solid electrolytic capacitor 1100 shown in FIGS. 22 to 24.

Anode terminal 10 and cathode terminal 11 are connected with anode lead frame 8 and cathode lead frame 9 of capacitor element unit 2101 at junctions 10B and 11B inside thin portions 10A and 11A at both sides of the center thick portions 10E and 11E by laser welding, respectively. Welding spots of these junctions are covered with resin package 12, thus providing an excellent external finish. This avoids a possibility of mounting defect attributable to improper contact caused by the welding spots in a mounting process, thereby providing the capacitor with a high reliability.

According to Embodiment 1, anode body 2 of capacitor element 1 is made of aluminum foil, but is not limited to it. The anode body may be made of other valve metal, such as a foil or a sintered body of tantalum or niobium, a combination of them.

Substrate 13 has the hoop shape made of copper alloy to obtain anode terminals 10 and cathode terminals 11, but may be made of other material and may have other shape.

Thin portions 10A and 11A of anode terminals 10 and cathode terminals 11 are formed by the etching. The thin portions may be made by press forming.

According to Embodiment 1, plural capacitor elements 1 are stacked and jointed to anode lead frame 8 and cathode lead frame 9 to provide capacitor element unit 2101, and then connected to anode terminal 10 and cathode terminal 11. However, the structure is not limited to that of this embodiment. One or more capacitor elements 1 may be connected directly to anode terminal 10 and cathode terminal 11. This can further reduce the ESL. The number of capacitor elements 1 provided in capacitor element unit 2101 is not necessarily limited to five, but may be determined to obtain a predetermined capacitance.

Exemplary Embodiment 2

Figure 4A:
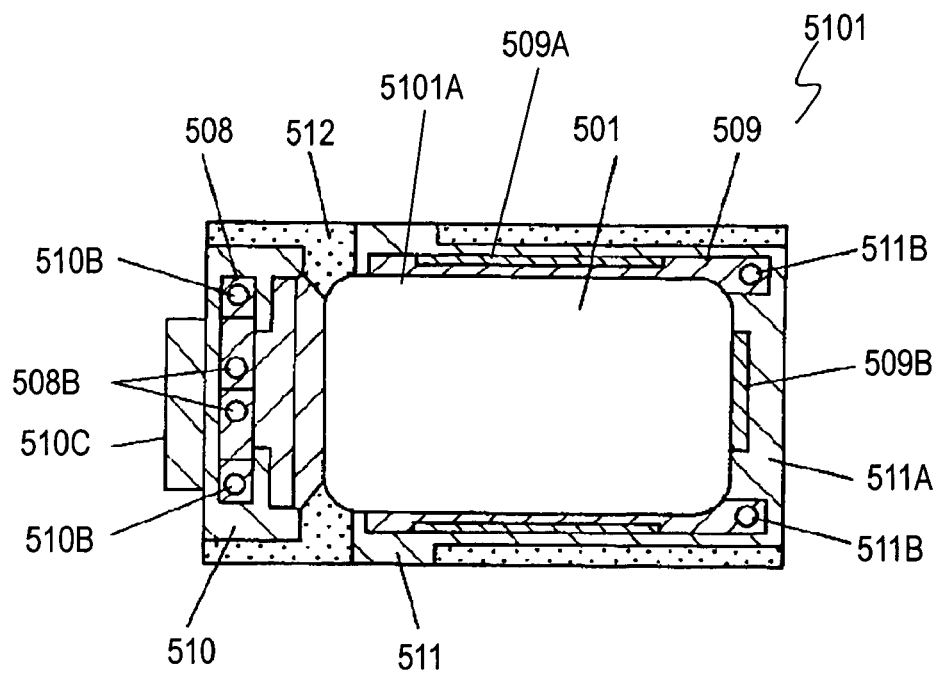
FIG. 4A is a plan view of a solid electrolytic capacitor according to Exemplary Embodiment 2 of the invention.
Figure 4B:
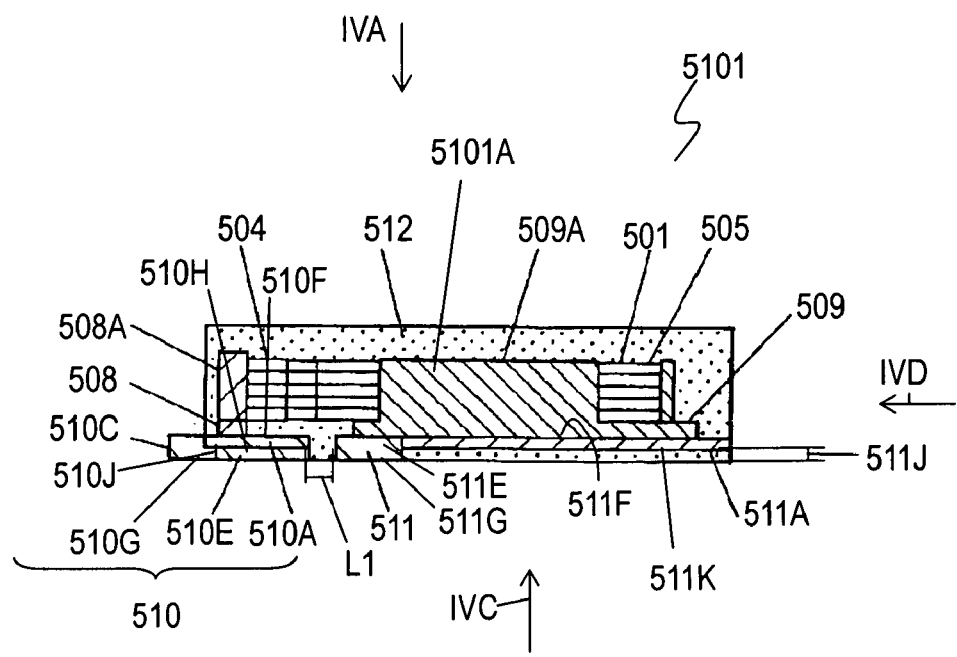
FIG. 4B is a front view of the solid electrolytic capacitor according to Embodiment 2.
Figure 4C:
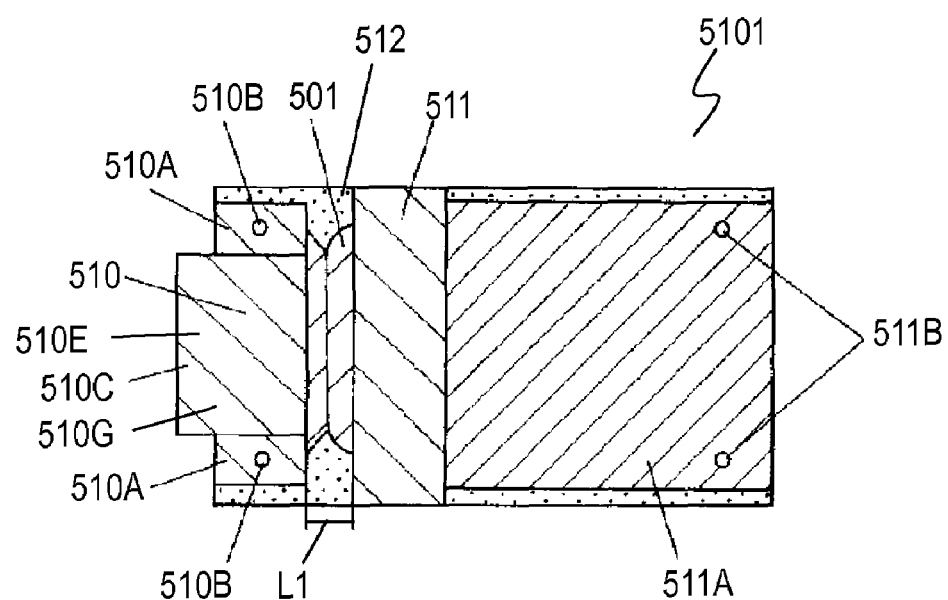
FIG. 4C is a bottom view of the solid electrolytic capacitor according to Embodiment 2.
Figure 4D:
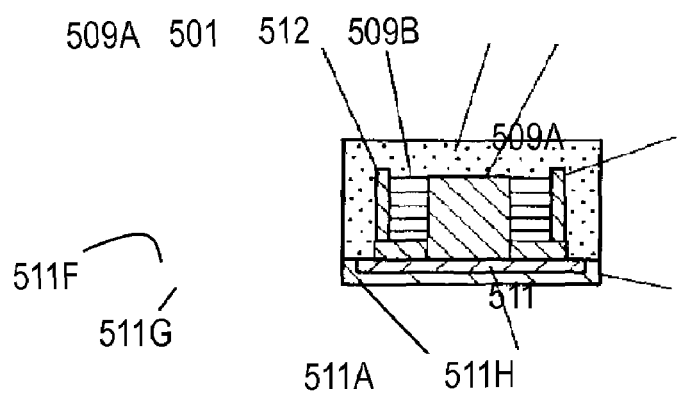
FIG. 4D is a side view of the solid electrolytic capacitor according to Embodiment 2.
Figure 5:
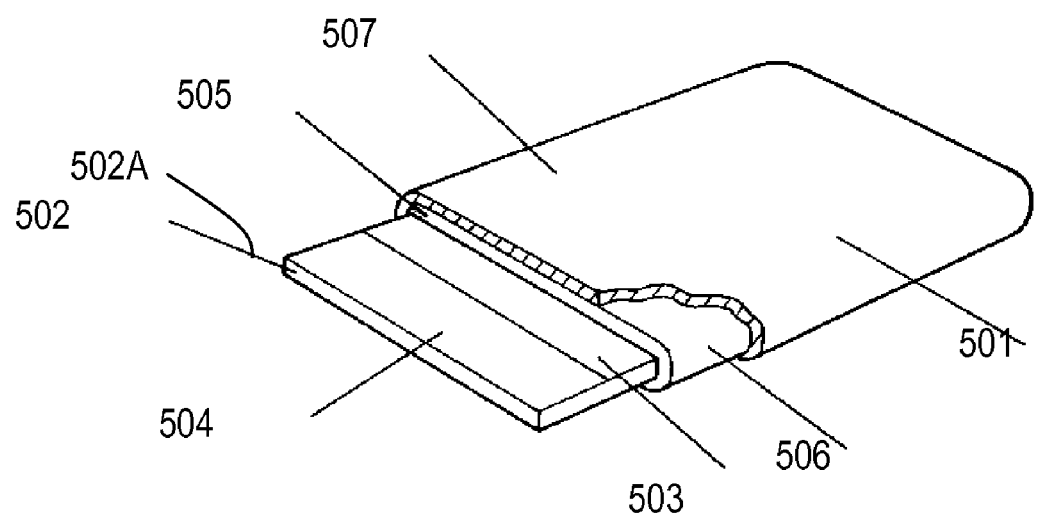
FIG. 5 is a perspective view of a capacitor element of the solid electrolytic capacitor according to Embodiment 2.

FIGS. 4A to 4D show solid electrolytic capacitor 5101 according to Exemplary Embodiment 2 of the invention. FIG. 4B is a front view of solid electrolytic capacitor 5101. FIGS. 4A, 4C, 4D are a plan view seen from direction IVA, a bottom view seen from direction IVC, and a side view seen from direction IVD of solid electrolytic capacitor 5101 shown in FIG. 4B, respectively. FIG. 5 is a perspective view of capacitor element 501 of solid electrolytic capacitor 5101.

As shown in FIG. 5, capacitor element 501 has a substantially flat plate shape as shown in FIG. 5. A surface of anode body 502 made of valve metal, such as aluminum foil is roughened and anodized to provide dielectric oxide layer 502A on the surface. Resist 503 having an insulating property is provided on dielectric oxide layer 502A to divide anode body 502 into cathode portion 505 and anode portion 504. Solid electrolyte layer 506 is provided on dielectric oxide layer 502A of cathode portion 505, and cathode layer 507 made of carbon and silver paste is placed on solid electrolyte layer 506.

According to Embodiment 2, five capacitor elements 501 are stacked so that anode portion 504 of one of capacitor elements 501 is positioned on anode lead frame 508. Guides 508A provided at both side ends of anode lead frame 508 are folded to wrap anode portions 504 of all of five capacitor elements 501, and are joined unitarily to anode portions 504 at junctions 508B by laser welding.

Cathode portions 505 of the five stacked capacitor elements 501 are placed over cathode lead frame 509 via a conductive adhesive. Five capacitor elements 501 are positioned and fixed by guides 509A at both side ends and guide 509B at a distal end of cathode lead frame 509, and are joined unitarily. Plural capacitor elements 501, anode lead frame 508, and cathode lead frame 509 unitarily assembled in the above manner provide capacitor element unit 5101A.

Anode terminal 510 has thick portion 510E at the center thereof and thin portions 510A. Thin portions 510A are thinner than thick portion 510E, and are connected to both sides of thick portion 510E. Thin portions 510A are formed in anode terminal 510 by providing recesses 510H in surface 510G opposite to surface 510F facing capacitor elements 501. Surface 510F of anode terminal 510 including thick portion 510E and thin portions 510A is flat. Thin portions 510A have portions of surface 510F of anode terminal 510, and thick portion 510E has a portion of surface 510F. Anode lead frame 508 of capacitor element unit 5101A is placed on surface 510F of anode terminal 510, and is connected to anode terminal 510 at junctions 510B inside thin portions 510A by laser welding. Protruding portion 510C having surface 510G of anode terminal 510 extending outward protrudes from resin package 512. Surface 510G functions as a mounting surface upon being mounted onto a mount body, such as a wiring board.

Surface 511G of cathode terminal 511 opposite to surface 511F facing capacitor element 501 is flush with surface 510G of anode terminal 510. Surface 511G of cathode terminal 511 is arranged as close to surface 510F of anode terminal 510 as possible. Distance L1 between surface 511G of cathode terminal 511 and surface 51-G of anode terminal 510 is not shorter than 1 mm, and preferably is 1 mm. The distance, being less than 1 mm, may cause a current leakage across the surfaces. Cathode terminal 511 has thick portion 511E having surface 511G and thin portion 511A. Thin portion 511A is thinner than thick portion 511E, and extends in a direction opposite to anode terminal 510. Surface 511F of cathode terminal 511 including thick portion 511E and thin portion 511A is flat. Thin portion 511A has a portion of surface 511F of cathode terminal 511, and thick portion 511E has a portion of surface 511F. Surface 511K of thin portion 511A is covered with resin package 512 and does not expose, thus not functioning as a mounting surface arranged to be mounted onto the mount body. Cathode lead frame 509 of the capacitor element unit 5101A is placed on surface 511F of cathode terminal 511, and is connected to cathode terminal 511 at junctions 511B inside thin portion 511A by laser welding.

Resin package 512 having an insulating property accommodates capacitor element unit 5101A unitarily and allows protruding portion 510C and surface 510G of anode terminal 510 and surface 511G of cathode terminal 511 to expose to the outside. According to Embodiment 2, resin package 512 is made of epoxy resin.

Figure 6A:
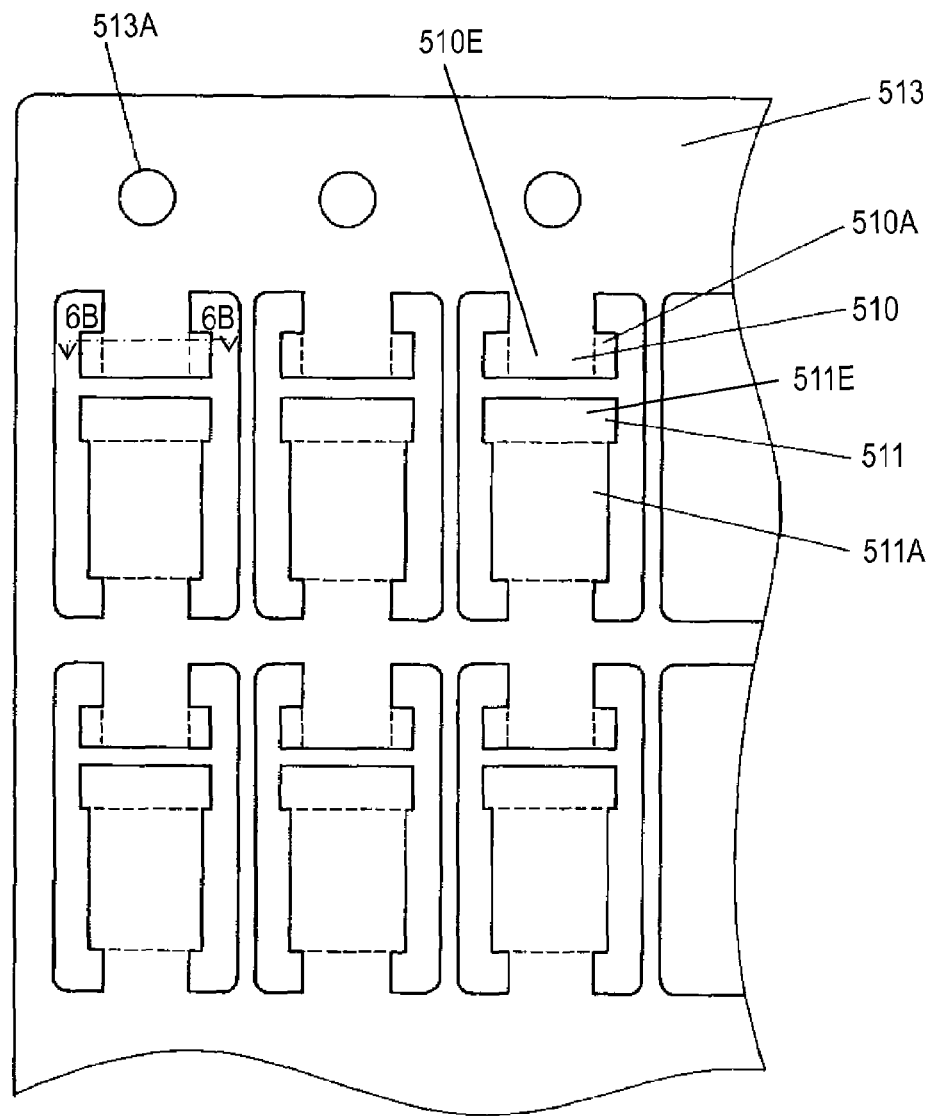
FIG. 6A is a plan view of a substrate used for manufacturing the solid electrolytic capacitor according to Embodiment 2.
Figure 6B:
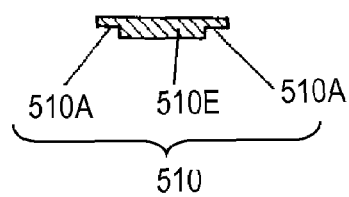
FIG. 6B is a cross sectional view of the substrate at line 6B-6B shown in FIG. 6A.

FIG. 6A is a plan view of substrate 513 having a hoop shape for providing plural anode terminals 510 and cathode terminals 511. FIG. 6B is a cross sectional view of substrate 513 at line 6B-6B shown in FIG. 6A. Substrate 513 is made of copper alloy, and has feed holes 513A formed therein for intermittent feeding. The anode terminals 510 and cathode terminals 511 are formed consecutively in substrate 513 at predetermined intervals. Plural capacitor element units 5101A are placed on and joined to respective ones of anode terminals 510 and cathode terminals 511, and are covered with resin packages 512, respectively. Then, anode terminals 510 and cathode terminals 511 are removed from substrate 513 to provide plural chip capacitors 5101.

Substrate 513 having anode terminals 510 and cathode terminals 511 is formed by etching a metal plate. The etching simultaneously provides thin portions 510A and 511A by removing unnecessary portions and thinning the both sides of anode terminals 510 and cathode terminals 511. Thickness differences 510J between thin portion 510A and thick portion 510E and thickness differences 511J between thin portion 511A and thick portion 511E are determined to be not less than 80 μm. This dimension of differences 510J and 511J is necessary for allowing resin package 512 to flow sufficiently in recesses 510H and on surface 511K when capacitor element unit 5101A is accommodated.

Solid electrolytic capacitor 5101 according to Embodiment 2 allows both anode portion 504 and cathode portion 505 of capacitor element 501 to be drawn out to the outside in a short distance through anode terminal 510 and cathode terminal 511 having flat plate shapes. Further, surface 511G of cathode terminal 511 is arranged as close to surface 510G of anode terminal 510 as possible in order to reduce the distance between anode terminal 510 and cathode terminal 511 to a shortest possible value, thereby providing a small equivalent series resistance (ESR) and a small equivalent series inductance (ESL). The ESL of solid electrolytic capacitor 5101 of Embodiment 2 was 500 pH, which was approximately one third of an ESL of 1500 pH of conventional solid electrolytic capacitor 1100 shown in FIGS. 22 to 24.

Anode terminal 510 and cathode terminal 511 are connected with anode lead frame 508 and cathode lead frame 509 of capacitor element unit 5101A at junctions 510B and 511B inside thin portions 510A and 511A by laser welding, respectively. Welding spots of these junctions are covered with resin package 512, thus providing an excellent external finish. This avoids a possibility of mounting defect attributable to improper contact caused by the welding spots in a mounting process, thereby providing the capacitor with a high reliability.

Surface 510G of anode terminal 510 has protruding portion 510C extending outward. This structure allows a solder fillet to be observable easily from above when the capacitor is soldered to be mounted to a mount body, such as a wiring board, thereby providing the capacitor with a high reliability of soldering.

According to Embodiment 2, anode body 502 of capacitor element 501 is made of aluminum foil, but is not limited to it. The anode body may be made of other valve metal of a foil or a sintered body of tantalum or niobium, a combination of them.

Substrate 513 has the hoop shape made of copper alloy to obtain anode terminals 510 and cathode terminals 511, but may be made of other material and may have another shape.

Thin portions 510A and 511A of anode terminals 510 and cathode terminals 511 are formed by the etching. The thin portions may be formed by press-forming.

According to Embodiment 2, plural capacitor elements 501 are stacked and jointed to anode lead frame 508 and cathode lead frame 509 to provide capacitor element unit 5101A, and then, are connected to anode terminal 510 and cathode terminal 511. However, the structure is not limited to that of this embodiment. One or more capacitor elements 501 may be connected directly to anode terminal 510 and cathode terminal 511. This can further reduce the ESL. The number of capacitor elements 501 provided in capacitor element unit 5101A is not necessarily five, but may be determined to obtain a predetermined capacitance.

Exemplary Embodiment 3

Figure 7A:
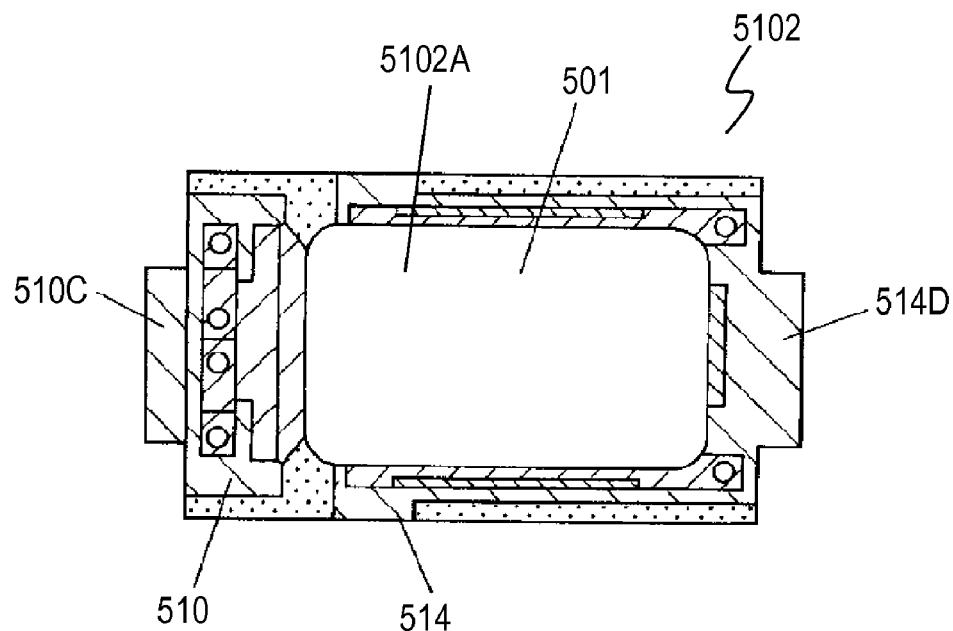
FIG. 7A is a plan view of a solid electrolytic capacitor according to Exemplary Embodiment 3 of the invention.
Figure 7B:
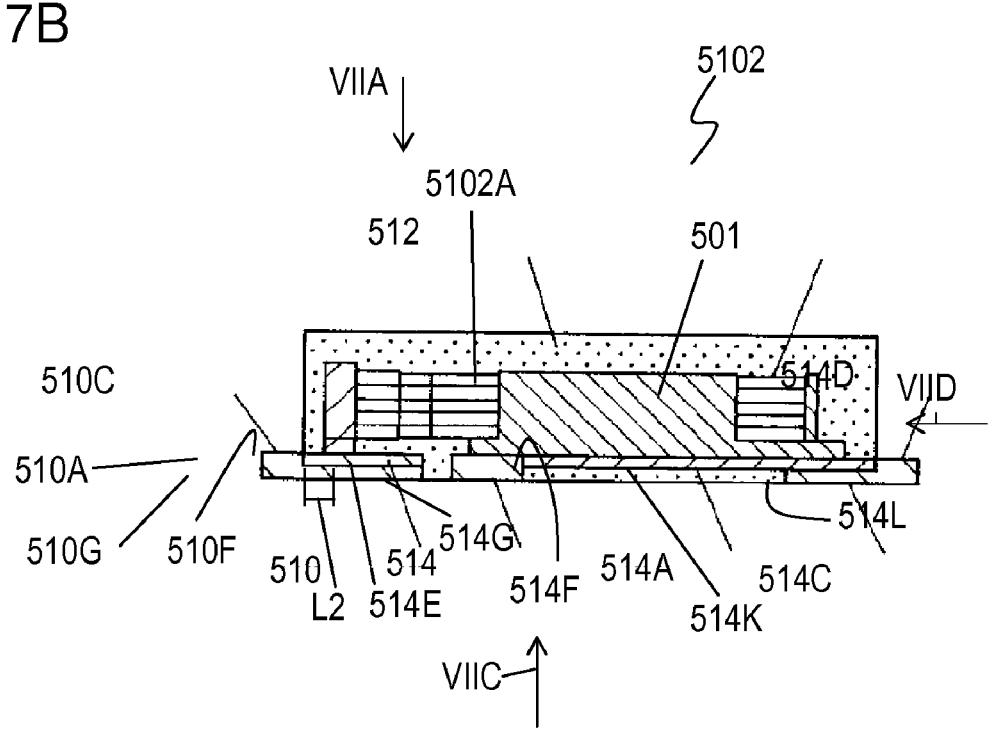
FIG. 7B is a front view of the solid electrolytic capacitor according to Embodiment 3.
Figure 7C:
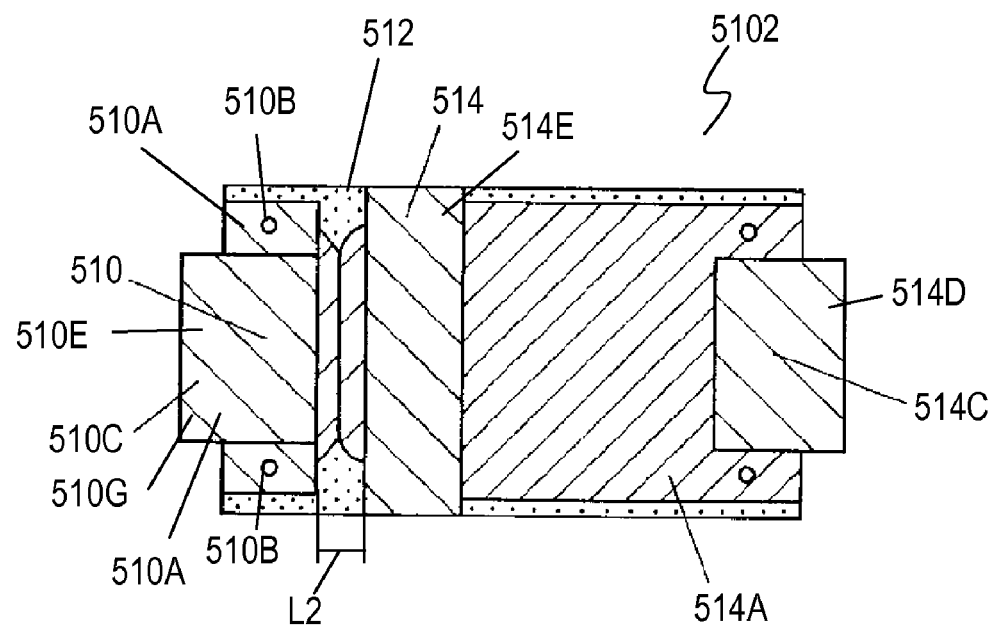
FIG. 7C is a bottom view of the solid electrolytic capacitor according to Embodiment 3.
Figure 7D:
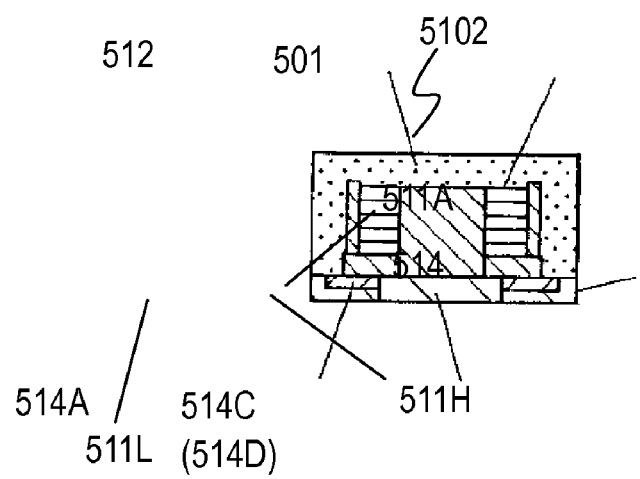
FIG. 7D is a side view of the solid electrolytic capacitor according to Embodiment 3.

FIGS. 7A to 7D show solid electrolytic capacitor 5102 according to Exemplary Embodiment 3 of the invention. FIG. 7B is a front view of solid electrolytic capacitor 5102. FIG. 7A, FIG. 7C and FIG. 7D are a plan view seen from direction VIIA, a bottom view seen from direction VIIC, and a side view seen from direction VIID of solid electrolytic capacitor 5102 shown in FIG. 7B. The same components as those of embodiment 2 will be denoted by the same reference numerals, and their detailed description is omitted.

Lower surface 514G of cathode terminal 514 is arranged to be flush with lower surface 510G (a mounting surface when mounted to a mount body, such as a wiring board) of anode terminal 510, and is positioned as close to lower surface 510G of anode terminal 510 as possible. Distance L2 between surface 514G of cathode terminal 514 and surface 510G of anode terminal 510 is not less than 1 mm, and preferably is 1 mm. The distance being less than 1 mm may cause a current leakage across the surfaces. Cathode terminal 514 includes thick portion 514E having surface 514G and thin portion 514A. Thin portion 514A is thinner than thick portion 514E, and extends from thick portion 514E in a direction opposite to anode terminal 510. Surface 514K of thin portion 514A opposite to a surface of the thin portion facing capacitor element 501 is covered with resin package 512 and does not expose, thus not functioning as a mounting surface arranged to be mounted to the mount body. Cathode terminal 514 includes mounting portion 514C at an end of thin portion 514A opposite to anode terminal 510. The mounting portion 514C has lower surface 514L functioning as a mounting surface when the capacitor is mounted. Surface 514L is flush with surfaces 510G and 514G. Mounting portion 514C extends outward to provide protruding portion 514D of cathode terminal 514 protruding from resin package 512.

Mounting portion 514C of cathode terminal 514 allows solid electrolytic capacitor 5102 according to Embodiment 3 to have the mounting surfaces provided at both ends, i.e., under anode terminal 510 and cathode terminal 514, thereby allowing the capacitor to be mounted stably on the mount body Mounting portion 514C of cathode terminal 514 has protruding portion 514D extending outward. This structure allows a solder fillet to be observable easily from above, similarly to protruding portion 510C of anode terminal 510, when the capacitor is soldered to be mounted to the mount body, thereby providing the capacitor with a high reliability of soldering.

Solid electrolytic capacitor 5102 according to Embodiment 3 has a small equivalent series resistance (ESR) and a small equivalent series inductance (ESL) similarly to solid electrolytic capacitor 5101 of Embodiment 2. The ESL of solid electrolytic capacitor 5102 of Embodiment 3 was 500 pH, which was one third of an ESL of 1500 pH of conventional solid electrolytic capacitor 1100 shown in FIGS. 22 to 24.

Exemplary Embodiment 4

Figure 8A:
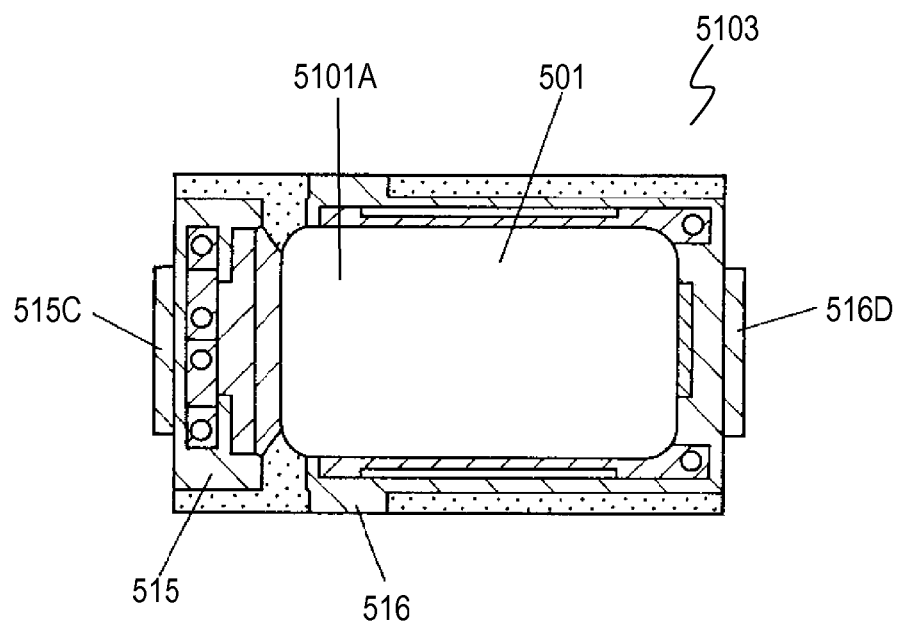
FIG. 8A is a plan view of a solid electrolytic capacitor according to Exemplary Embodiment 4 of the invention.
Figure 8B:
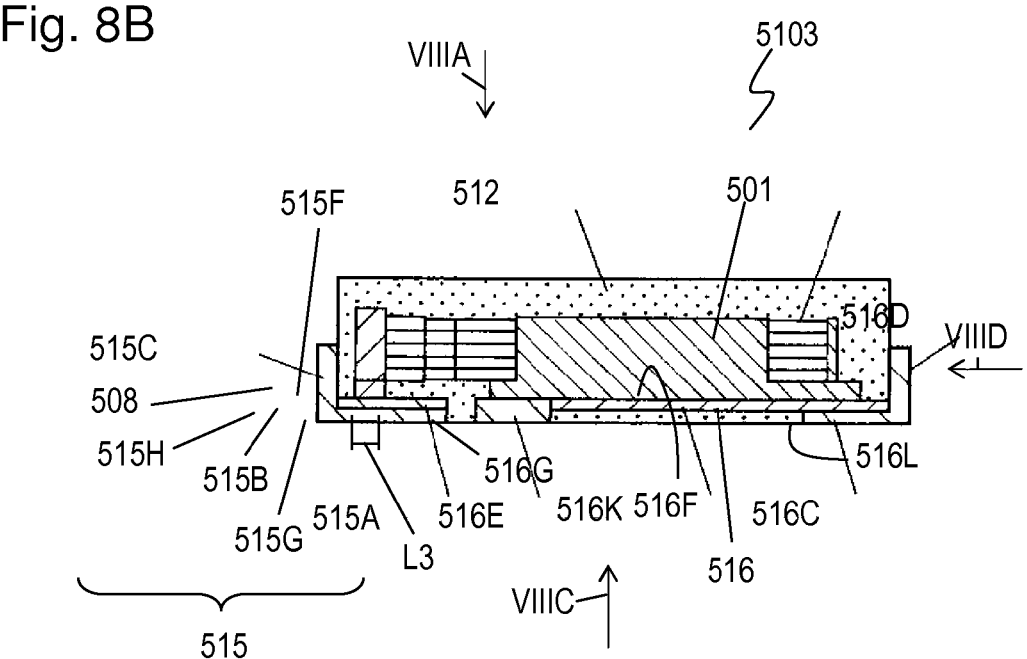
FIG. 8B is a front view of the solid electrolytic capacitor according to Embodiment 4.
Figure 8C:
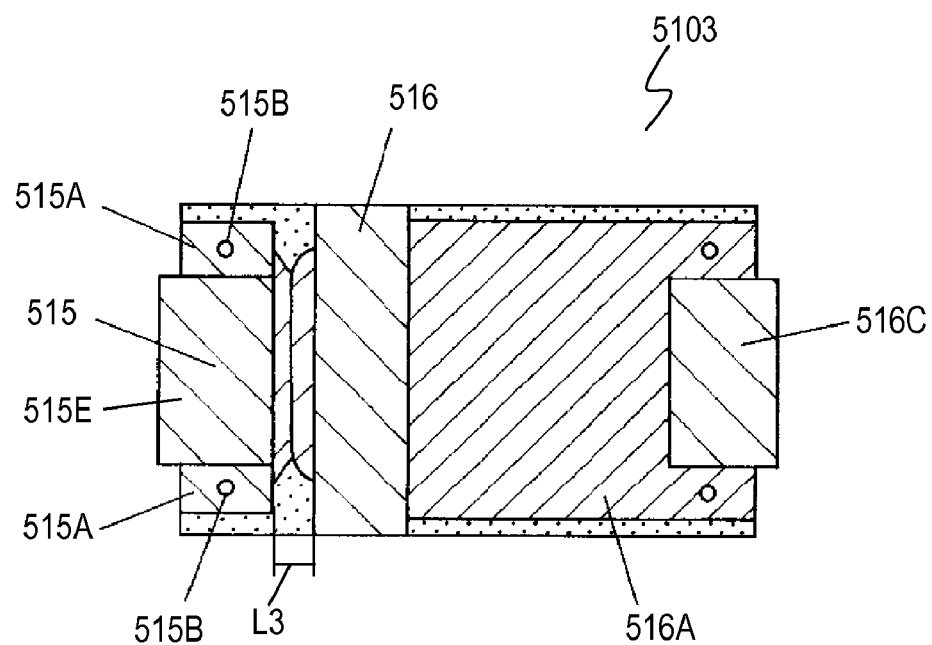
FIG. 8C is a bottom view of the solid electrolytic capacitor according to Embodiment 4.
Figure 8D:
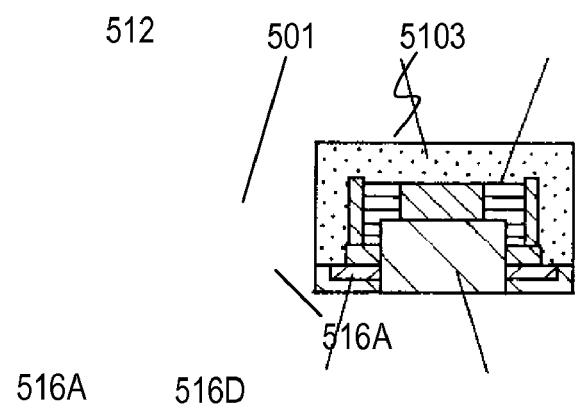
FIG. 8D is a side view of the solid electrolytic capacitor according to Embodiment 4.

FIGS. 8A to 8D show solid electrolytic capacitor 5103 according to Exemplary Embodiment 4 of the invention. FIG. 8B is a front view of solid electrolytic capacitor 5103. FIGS. 8A, 8C, and 8D are a plan view seen from direction VIIIA, a bottom view seen from direction VIIIC, and a side view seen from direction VIIID of solid electrolytic capacitor 5103 shown in FIG. 8B. The same component as those of Embodiment 3 will be denoted by the same reference numerals, and their detailed description will be omitted.

Anode terminal 515 includes thick portion 515E at the center thereof and thin portions 515A. Thin portions 515A are thinner than thick portion 515E, and are connected to both sides of thick portion 515E. Thin portions 515A are formed in anode terminal 515 by providing recesses 515H in surface 515G opposite to surface 515F facing capacitor elements 501. Surface 515F of anode terminal 515 including thick portion 515E and thin portions 515A is flat. Thin portions 515A have portions of surface 515F of anode terminal 515, and thick portion 515E has a portion of surface 515F. Anode lead frame 508 of capacitor element unit 5101A is placed on surface 515F of anode terminal 515, and is connected to anode terminal 515 at junctions 515B inside thin portions 515A by laser welding. Surface 515G functions as a mounting surface when being mounted to a mount body, such as a wiring board. Surface 515G of anode terminal 515 extends outward, providing anode terminal 515 with protruding portion 515C protruding from resin package 512. Protruding portion 515C corresponds to protruding portion 510C of anode terminal 510 of Embodiments 2 and 3.

Protruding portion 515C is bent upward along a side surface (i.e., an exterior surface) of resin package 512, having a shape extending along an exterior of resin package 512.

Lower surface 516G of cathode terminal 516 is arranged to be flush with lower surface 515G of anode terminal 515, and is positioned as close to lower surface 515G of anode terminal 515 as possible. Distance L3 between surface 516G of cathode terminal 516 and surface 515G of anode terminal 515 is not less than 1 mm, and is preferably 1 mm. The distance being less than 1 mm may cause a current leakage across the surfaces. Lower surface 516G of cathode terminal 516 functions as a mounting surface to be mounted on a mount body. Cathode terminal 516 includes thick portion 516E having surface 516G, and thin portion 516A. Thin portion 516A is thinner than thick portion 516E, and extends from thick portion 516E in a direction opposite to anode terminal 515. Surface 516K of thin portion 516A opposite to the surface of the thin portion facing capacitor elements 501 is covered with resin package 512 and does not expose, not functioning as a mounting surface to be mounted on the mount body. Cathode terminal 516 includes mounting portion 516C at one end of thin portion 516A opposite to anode terminal 515. Mounting portion 516A has lower surface 516L functioning as a mounting surface when the capacitor is mounted. Surface 516L is flush with surfaces 515G and 516G. Mounting portion 516C extends outward to provide protruding portion 516D of cathode terminal 516 protruding from resin package 512. Protruding portion 516D corresponds to protruding portion 514D of cathode terminal 514 of Embodiment 3. Protruding portion 516D is bent upward along the side surface (an exterior surface) of resin package 512, having a shape extending along an exterior of resin package 512.

Mounting portion 516C of cathode terminal 516 allows solid electrolytic capacitor 5103 according to Embodiment 4 to have the mounting surfaces provided at the both ends, i.e., under anode terminal 515 and cathode terminal 516, thus allowing the capacitor to be mounted stably to the mount body Protruding portions 515C and 516D extend from resin package 512 and along its exterior surfaces. This structure allows solder fillets to be easily observable from above when the capacitor is soldered to be mounted to the mount body, thereby providing the capacitor with a high reliability of soldering.

Solid electrolytic capacitor 5103 according to Embodiment has a small equivalent series resistance (ESR) and a small equivalent series inductance (ESL) similarly to solid electrolytic capacitor 5101 of Embodiment 2. The ESL of solid electrolytic capacitor 5103 of Embodiment 4 was 500 pH, which is one third of an ESL of 1500 pH of conventional solid electrolytic capacitor 1100 shown in FIGS. 22 to 24.

Exemplary Embodiment 5

Figure 9A:
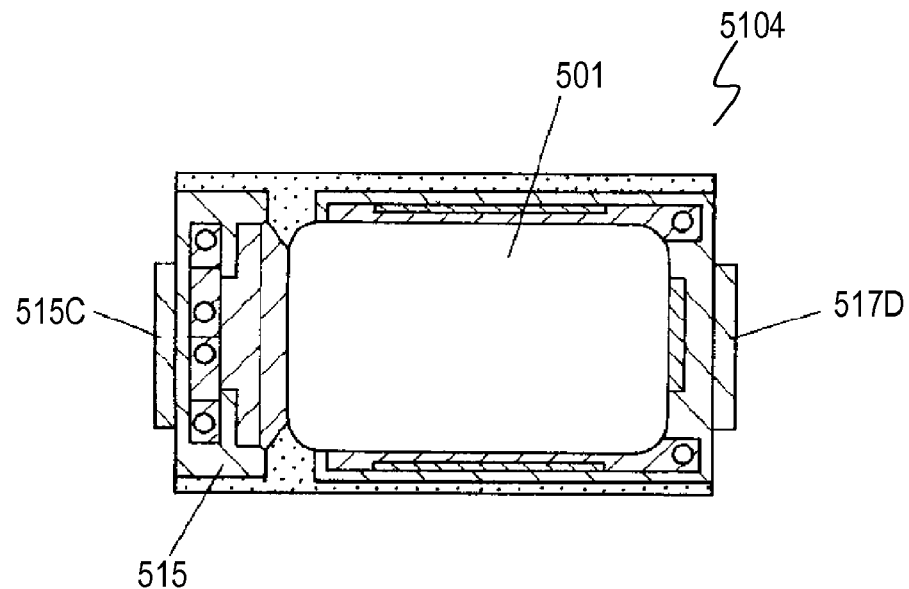
FIG. 9A is a plan view of a solid electrolytic capacitor according to Exemplary Embodiment 5 of the invention.
Figure 9B:
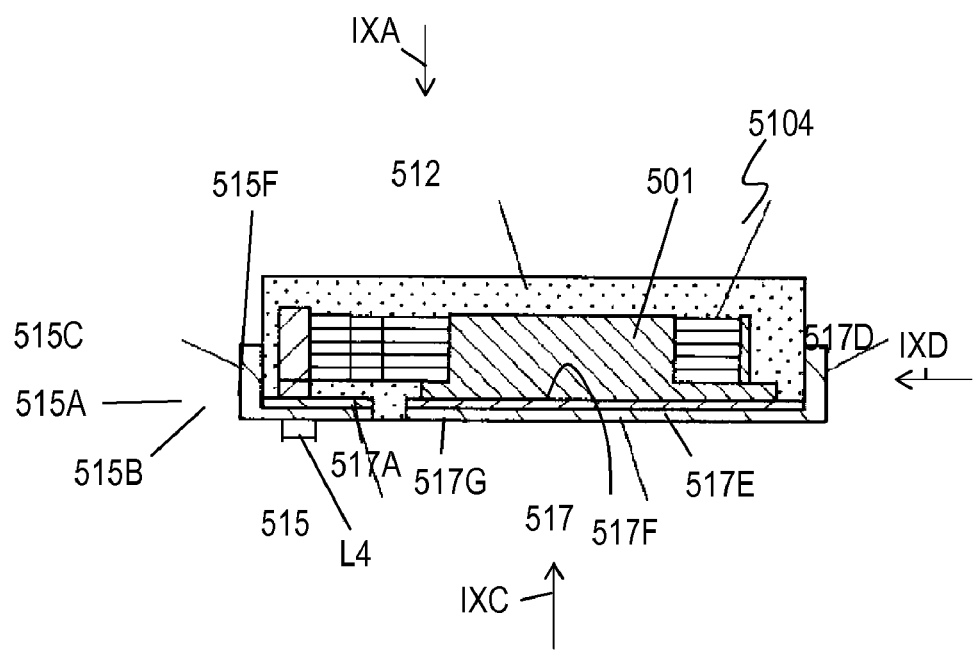
FIG. 9B is a front view of the solid electrolytic capacitor according to Embodiment 5.
Figure 9C:
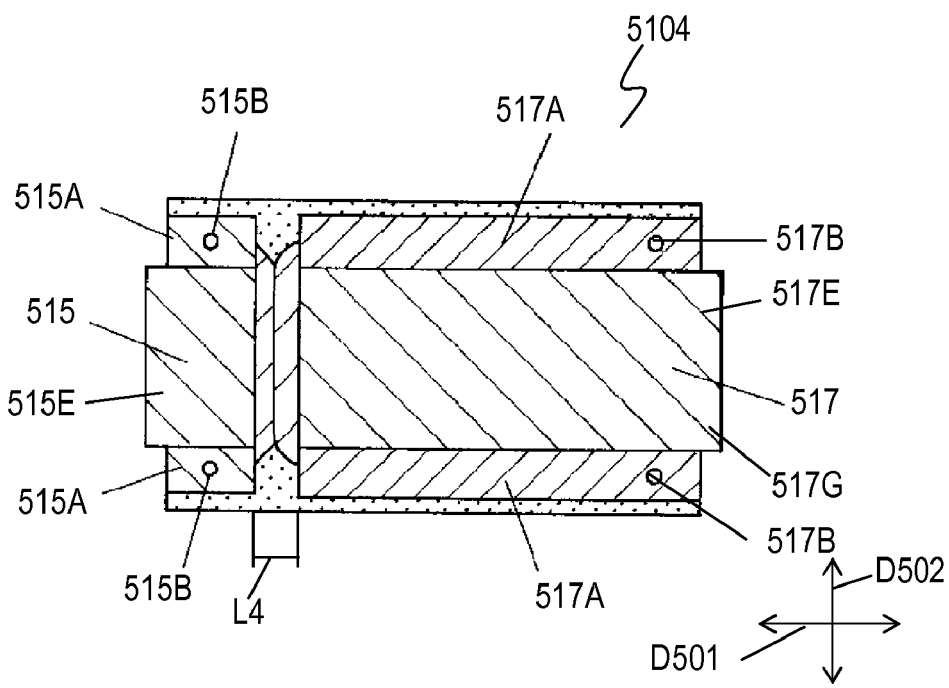
FIG. 9C is a bottom view of the solid electrolytic capacitor according to Embodiment 5.
Figure 9D:
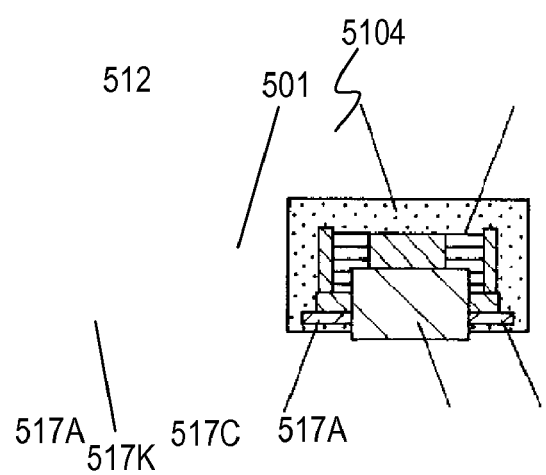
FIG. 9D is a side view of the solid electrolytic capacitor according to Embodiment 5.

FIGS. 9A to 9D show solid electrolytic capacitor 5104 according to Exemplary Embodiment 5 of the invention. FIG. 9B is a front view of solid electrolytic capacitor 5104. FIG. 9A, FIG. 9C and FIG. 9D are a plan view seen from direction IXA, a bottom view seen from direction IXC, and a side view seen from direction IXD of solid electrolytic capacitor 5104 shown in FIG. 9B. The same components as those of Embodiment 4 will be denoted by the same reference numerals, and their detailed description will be omitted.

Lower surface 517G of cathode terminal 517 opposite to surface 517F facing capacitor elements 501 is arranged to be flush with lower surface 515G of anode terminal 515, and is positioned as close to lower surface 515G of anode terminal 515 as possible. Distance L4 between surface 517G of cathode terminal 517 and surface 515G of anode terminal 515 is not less than 1 mm, and is preferably 1 mm. The distance being less than 1 mm may cause a current leakage across the surfaces. Cathode terminal 517 includes thick portion 517E having surface 517G, and thin portions 517A. Thin portions 517A are thinner than thick portion 517E, and are connected to both sides of thick portion 517E. Surface 517K of cathode terminal 517 opposite to surface 517F is covered with resin package 512 and does not expose, thus not functioning as a mounting surface to be mounted onto a mount body. Cathode terminal 517 includes protruding portion 517C at an end of thin portions 517A opposite to anode terminal 515. Lower surface 517G of cathode terminal 517 extends to an end of the surface opposite to anode terminal 515. Thin portions 517A are provided at two sides of cathode terminal 517 in direction D502 perpendicular to direction D501 in which anode terminal 515 and cathode terminal 517 are arranged. That is, thick portion 517E of cathode terminal 517 is provided between thin portions 517A, and thin portions 517A and thick portion 517E are arranged in direction D502.

In anode terminal 515, thick portion 515E is provide between thin portions 515A, so that thin portions 515A and thick portion 515E are arranged in direction D502.

In addition to advantages of solid electrolytic capacitor 5103 of Embodiment 4, solid electrolytic capacitor 5104 has cathode terminal 517 easily formed, and is stably mountable to a mount body.

Solid electrolytic capacitor 5104 of Embodiment 5, similarly to solid electrolytic capacitor 5101 of Embodiment 2, has a small equivalent series resistance (ESR) and a small equivalent series inductance (ESL). The ESL of solid electrolytic capacitor 5104 of Embodiment 5 was 500 pH, which is one third of an ESL of 1500 pH of conventional solid electrolytic capacitor 1100 shown in FIGS. 22 to 24.

Exemplary Embodiment 6

Figure 10A:
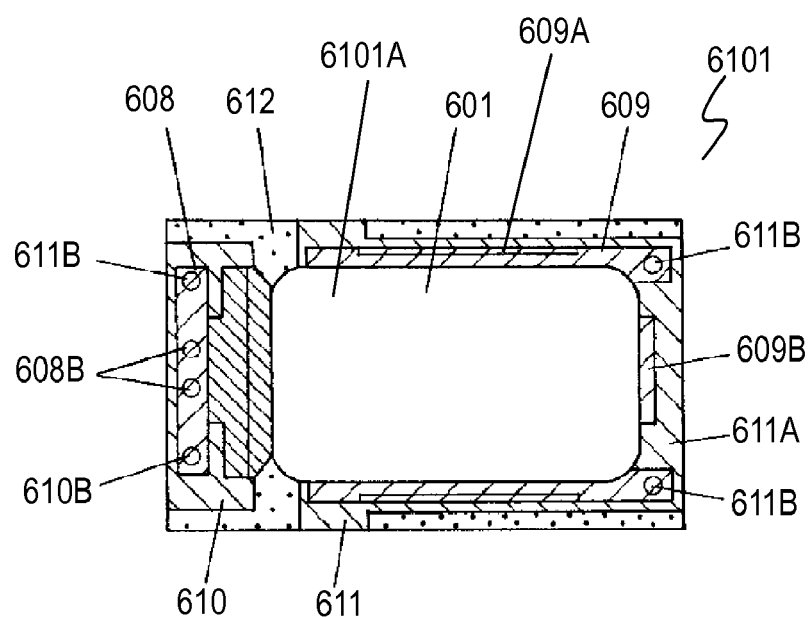
FIG. 10A is a plan view of a solid electrolytic capacitor according to Exemplary Embodiment 6 of the invention.
Figure 10B:
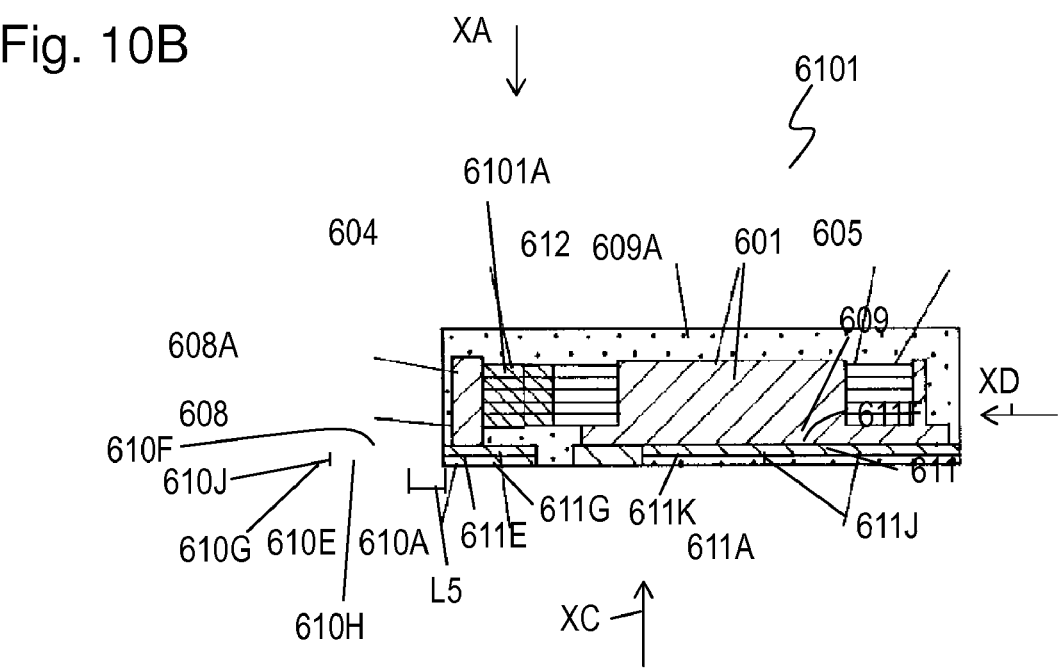
FIG. 10B is a front view of the solid electrolytic capacitor according to Embodiment 6.
Figure 10C:
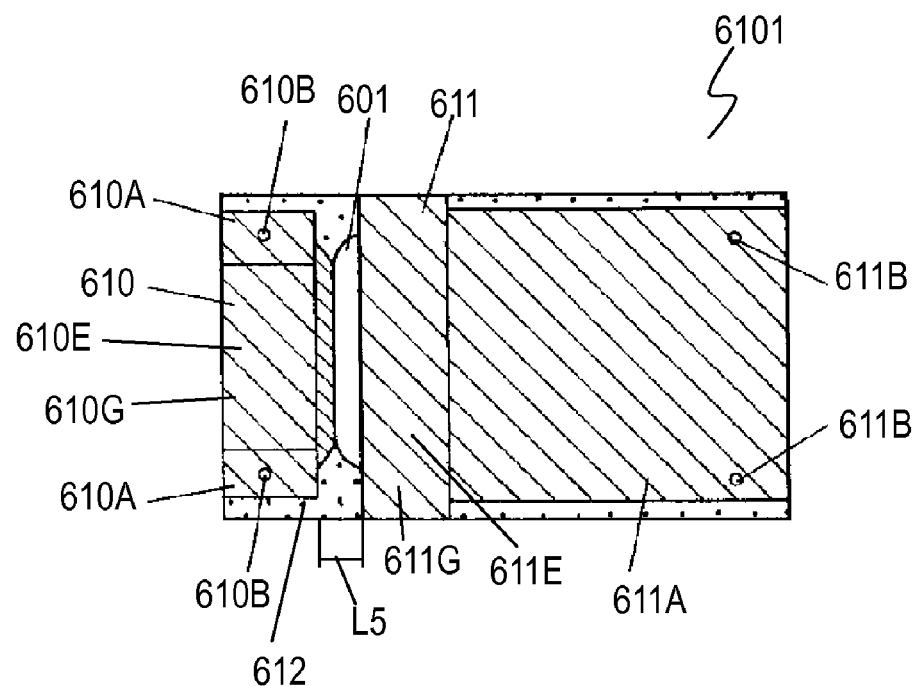
FIG. 10C is a bottom view of the solid electrolytic capacitor according to Embodiment 6.
Figure 10D:
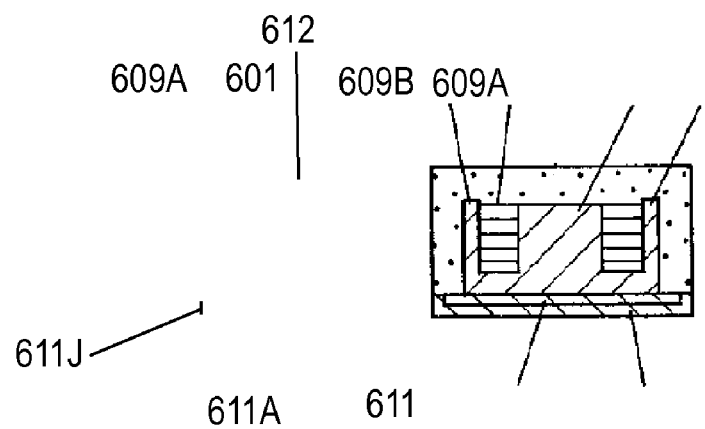
FIG. 10D is a side view of the solid electrolytic capacitor according to Embodiment 6.
Figure 11:
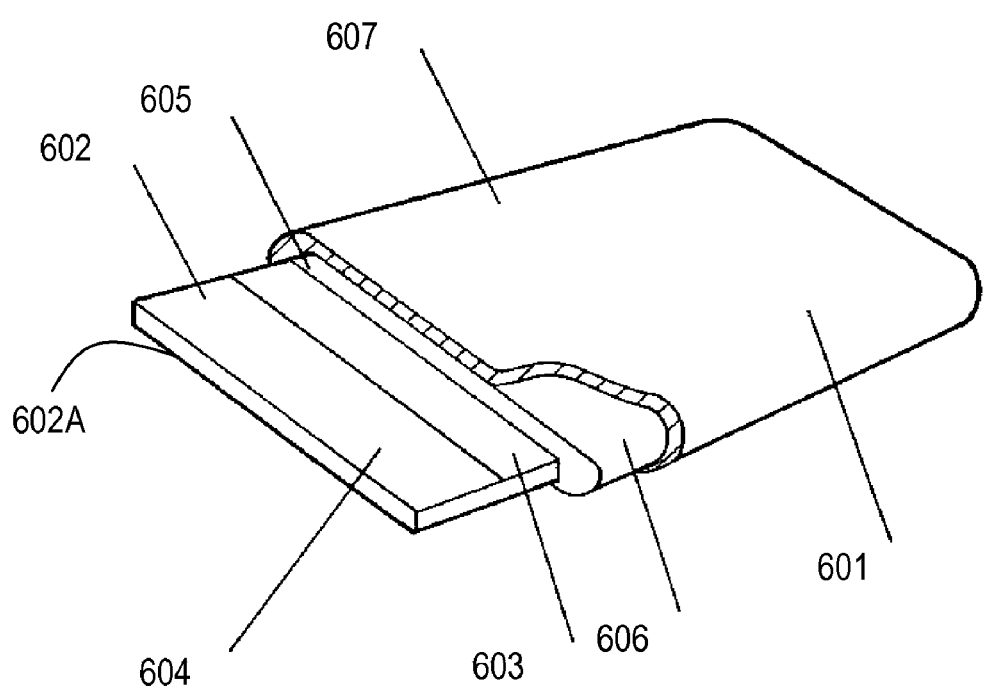
FIG. 11 is a perspective view of a capacitor element of the solid electrolytic capacitor according to Embodiment 6.

FIGS. 10A to 10D show solid electrolytic capacitor 6101 according to Exemplary Embodiment 6 of the present invention. FIG. 10B is a front view of solid electrolytic capacitor 6101. FIGS. 10A, 10C, and 10D are a plan view seen from direction XA, a bottom view seen from direction XC, and a side view seen from direction XD of solid electrolytic capacitor 6101 shown in FIG. 10B. FIG. 11 is a perspective view of capacitor element 601 of solid electrolytic capacitor 6101.

As shown in FIG. 11, capacitor element 601 has a flat plate shape. A surface of anode body 602 made of valve metal, such as aluminum foil is roughened and anodized, providing dielectric oxide layer 602A on the surface. Resist 603 having an insulating property is provided on dielectric oxide layer 602A to divide anode body 602 into cathode portion 605 and anode portion 604. Solid electrolyte layer 606 is provided on dielectric oxide layer 602A of cathode portion 605, and cathode layer 607 made of carbon and silver paste is then placed on solid electrolyte layer 606.

According to Embodiment 6, five capacitor elements 601 are stacked so that anode portion 604 of one of capacitor elements 601 is positioned on anode lead frame 608. Guides 608A at both side ends of anode lead frame 608 are folded to wrap anode portions 604 of all five capacitor elements 601, and joined unitarily to anode portions 604 at junctions 608B by laser welding.

Cathode portions 605 of the five stacked capacitor elements 601 are placed over cathode lead frame 609 via a conductive adhesive. Five capacitor elements 601 are positioned and fixed by guides 609A at both side ends and guide 609B at a distal end of cathode lead frame 609, and joined unitarily. Capacitor elements 601, anode lead frame 608, and cathode lead frame 609 unitarily assembled in the above manner provide capacitor element unit 6101A.

Anode terminal 610 has thick portion 610E at the center thereof and thin portions 610A. Thin portions 610A are thinner than thick portion 610E, and connected to both sides of thick portion 610E. Thin portions 610A are formed in anode terminal 610 by providing recesses 610H in surface 610G opposite to surface 610F facing capacitor elements 601. Surface 610F of anode terminal 610 including thick portion 610E and thin portions 610A is flat. Thin portions 610A have portions surface 610F of anode terminal 610, and thick portion 610E has a portion of surface 610F. Anode lead frame 608 of capacitor element unit 6101A is placed on surface 610F of anode terminal 610, and is connected to anode terminal 610 at junctions 610B inside thin portions 610A by laser welding.

Surface 611G of cathode terminal 611 opposite to surface 611F facing capacitor elements 601 is flush with surface 610G of anode terminal 610. Surface 611G of cathode terminal 611 is arranged as close to surface 610G of anode terminal 610 as possible. Distance L5 between surface 611G of cathode terminal 611 and surface 610G of anode terminal 610 is not less than 1 mm, and preferably is 1 mm. The distance being less than 1 mm may cause a current leakage across the surfaces. Cathode terminal 611 includes thick portion 611E having surface 611G, and thin portion 611A. Thin portion 611A is thinner than thick portion 611E, and extends in a direction opposite to anode terminal 610. Surface 611F of cathode terminal 611 including thick portion 611E and thin portion 611A is flat. Thin portion 611A has a portion of surface 611F of cathode terminal 611, and thick portion 611E has a portion of surface 611F. Surface 611K of thin portion 611A opposite to surface 611F is covered with resin package 612 and does not expose, thus not functioning as a mounting surface to be mounted to a mount body. Cathode lead frame 609 of capacitor element unit 6101A is placed on surface 611F of cathode terminal 611, and is connected to cathode terminal 611 at junctions 611B inside thin portion 611A by laser welding.

Resin package 612 having an insulating property accommodates capacitor element unit 6101A unitarily so that surface 610G of anode terminal 610 and surface 611G of cathode terminal 611 expose to the outside. According to Embodiment 6, resin package 612 is made of epoxy resin.

Figure 12A:
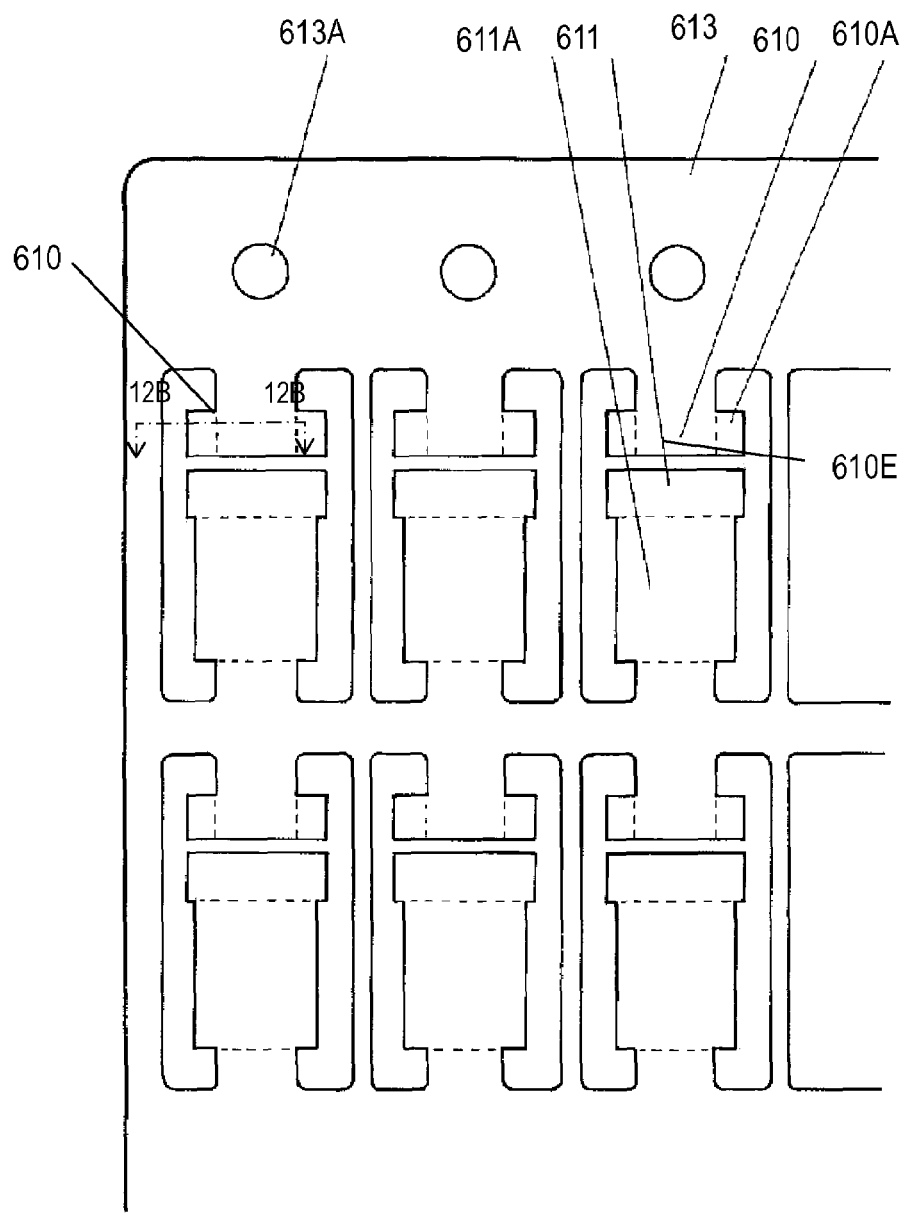
FIG. 12A is a plan view of a substrate used for manufacturing the solid electrolytic capacitor according to Embodiment 6.
Figure 12B:
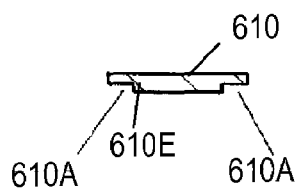
FIG. 12B is a cross sectional view of the substrate at line 12B-12B shown in FIG. 12A.

FIG. 12A is a plan view of substrate 613 having a hoop shape for providing plural anode terminals 610 and cathode terminals 611. FIG. 12B is a cross sectional view of substrate 613 at line 12B-12B shown in FIG. 12A. Substrate 613 is made of copper alloy, and has feed holes 613A formed therein for intermittent feeding. Plural anode terminals 610 and cathode terminals 611 are formed consecutively in substrate 613 at predetermined intervals. Plural capacitor element units 6101A are placed on and joined to respective ones of plural anode terminals 610 and cathode terminals 611, and are covered with resin packages 612, respectively. Anode terminals 610 and cathode terminals 611 are then removed from substrate 613 to provide plural chip capacitors 6101.

Substrate 613 having plural anode terminals 610 and cathode terminals 611 formed therein is formed by etching a metal plate. The etching provides simultaneously thin portions 610A and 611A by removing unnecessary portions and thinning the both sides of anode terminals 610 and cathode terminals 611. Thickness difference 610J between thin portion 610A and thick portion 610E and thickness difference 611J between thin portion 611A and thick portion 611E are determined to be not less than 80 μm. This dimension of differences 610J and 611J is necessary for allowing resin package 612 to flow sufficiently in recesses 610H and on surface 611K when capacitor element unit 6101A is accommodated.

Solid electrolytic capacitor 6101 according to Embodiment 6 allows both anode portion 604 and cathode portion 605 of capacitor element 601 to be drawn to the outside in a short distance through anode terminal 610 and cathode terminal 611 having flat plate shapes. Further, surface 611G of cathode terminal 611 is arranged as close to surface 610G of anode terminal 610 as possible in order to reduce the distance between anode terminal 610 and cathode terminal 611 to a shortest possible value, thereby providing the capacitor with a small equivalent series resistance (ESR) and a small equivalent series inductance (ESL). The ESL of solid electrolytic capacitor 6101 of Embodiment 6 was 500 pH, which is about one third of an ESL of 1500 pH of conventional solid electrolytic capacitor 1100 shown in FIGS. 22 to 24.

Anode terminal 610 and cathode terminal 611 are connected with anode lead frame 608 and cathode lead frame 609 of capacitor element unit 6101A at junctions 610B and 611B inside thin portions 610A and 611A by laser welding, respectively. Welding spots of these junctions are covered with resin package 612, providing an excellent external finish. This avoids a possibility of mounting defect attributable to improper contact caused by the welding spots in a mounting process, thereby providing the capacitor with a high reliability.

According to Embodiment 6, anode body 602 of capacitor element 601 is made of aluminum foil, but is not limited to it. The anode body may be made of other valve metal, such as foil or a sintered body of tantalum or niobium, a combination of them.

Substrate 613 has the hoop shape made of copper alloy to obtain anode terminals 610 and cathode terminals 611, but may be made of other material and may have another shape.

Thin portions 610A and 611A of anode terminals 610 and cathode terminals 611 are formed by the etching. The thin portions may be made by press forming.

According to Embodiment 6, plural capacitor elements 601 are stacked and jointed to anode lead frame 608 and cathode lead frame 609 to provide capacitor element unit 6101A, and are then connected to anode terminal 610 and cathode terminal 611. However, the structure is not limited to that of this embodiment. One or more capacitor elements 601 may be connected directly to anode terminal 610 and cathode terminal 611. This can further reduce the ESL. The number of capacitor elements 601 provided in capacitor element unit 6101A is not necessarily five, and may be determined to provide a predetermined capacitance.

Exemplary Embodiment 7

Figure 13A:
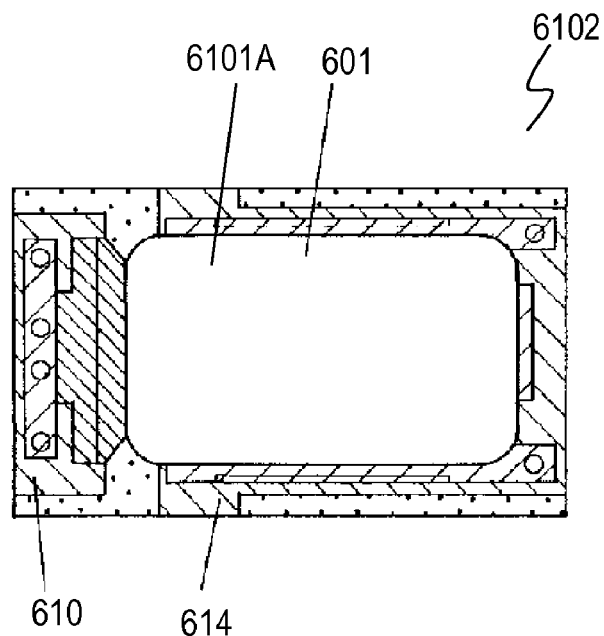
FIG. 13A is a plan view of a solid electrolytic capacitor according to Exemplary Embodiment 7 of the invention.
Figure 13B:
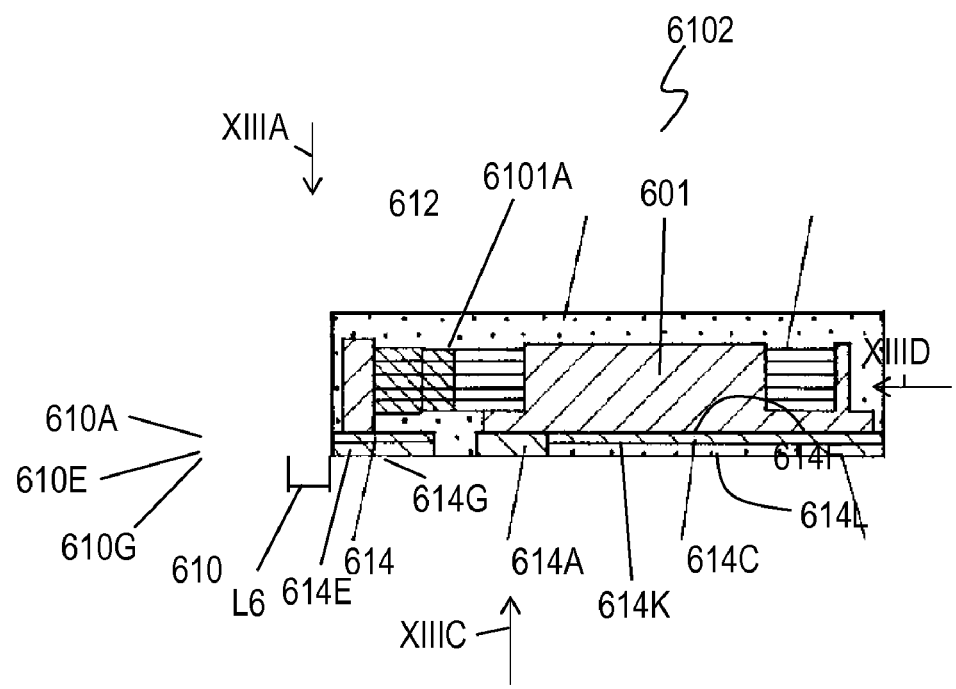
FIG. 13B is a front view of the solid electrolytic capacitor according to Embodiment 7.
Figure 13C:
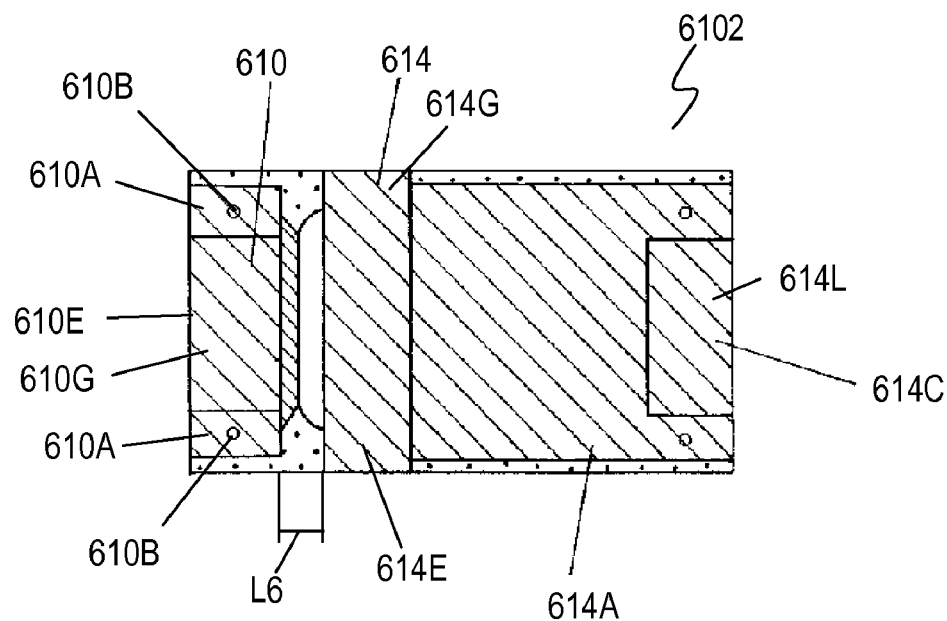
FIG. 13C is a bottom view of the solid electrolytic capacitor according to Embodiment 7.
Figure 13D:
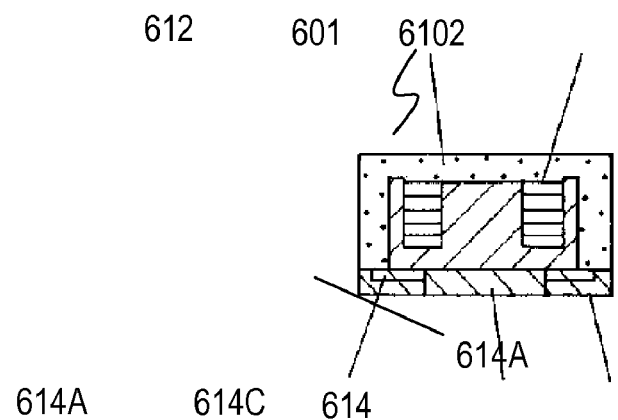
FIG. 13D is a side view of the solid electrolytic capacitor according to Embodiment 7.

FIGS. 13A to 13D show solid electrolytic capacitor 6102 according to Exemplary Embodiment 7 of the invention. FIG. 13B is a front view of solid electrolytic capacitor 6102. FIGS. 13A, 13C, and 13D are a plan view seen from direction XIIIA, a bottom view seen from direction XIIIC, and a side view seen from direction XIIID of solid electrolytic capacitor 6102 shown in FIG. 13B. The same components as those of Embodiment 6 will be denoted by the same reference numerals, and their detailed description will be omitted.

Lower surface 614G of cathode terminal 614 is arranged to be flush with anode terminal 610, and is positioned as close to lower surface 610G of anode terminal 610 as possible. Surface 610G functions as a mounting surface to be mounted to a mount body, such as a wiring board. Distance L6 between surface 614G of cathode terminal 614 and surface 610G of anode terminal 610 is not less than 1 mm, and is preferably 1 mm. The distance being less than 1 mm may cause a current leakage across the surfaces. Cathode terminal 614 includes thick portion 614E having surface 614G, and thin portion 614A. Thin portion 614A is thinner than thick portion 614E, and extends from thick portion 614E in a direction opposite to anode terminal 610. Surface 614K of thin portion 614A opposite to a surface facing capacitor elements 601 is covered with resin package 612 and does not expose, thus not functioning as a mounting surface to be mounted on the mount body. Cathode terminal 614 includes mounting portion 614C at one end of thin portion 614A opposite to anode terminal 610. Mounting portion 614C has lower surface 614L functioning as a mounting surface when the capacitor is mounted. Surface 614L is flush with surfaces 610G and 614G.

Mounting portion 614C of cathode terminal 614 allows solid electrolytic capacitor 6102 according to Embodiment 7 to have the mounting surfaces formed at both ends, i.e., under anode terminal 610 and cathode terminal 614, thereby allowing the capacitor to be mounted stably to the mount body Solid electrolytic capacitor 6102 according to Embodiment 7 has a small equivalent series resistance (ESR) and a small equivalent series inductance (ESL), similarly to solid electrolytic capacitor 6101 of Embodiment 7. The ESL of solid electrolytic capacitor 6102 of Embodiment 7 was 500 pH, which is one third of an ESL of 1500 pH of conventional solid electrolytic capacitor 1100 shown in FIGS. 22 to 24.

Exemplary Embodiment 8

Figure 14A:
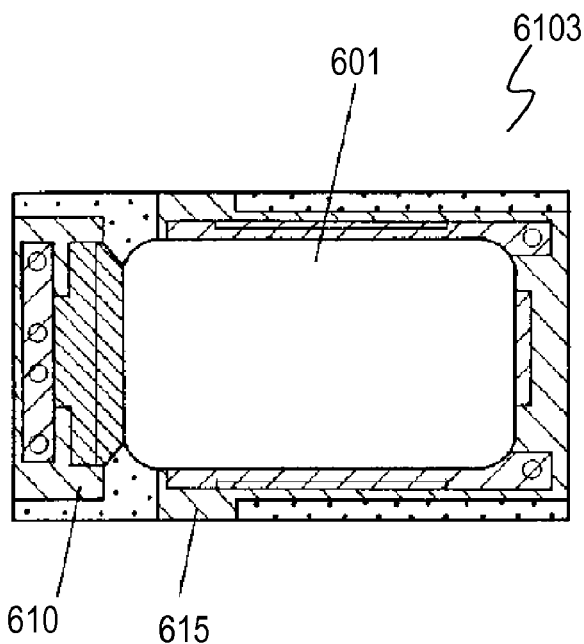
FIG. 14A is a plan view of a solid electrolytic capacitor according to Exemplary Embodiment 8 of the invention.
Figure 14B:
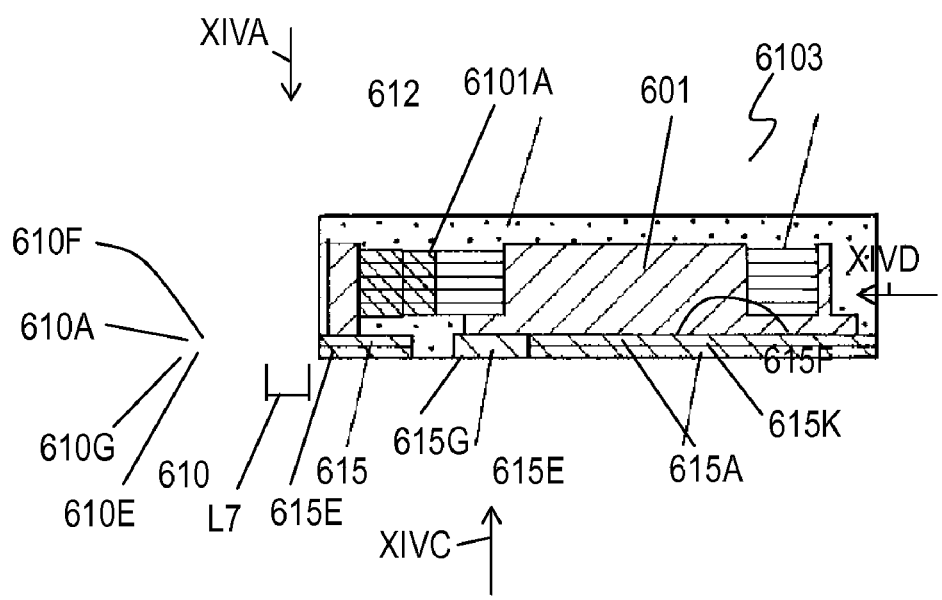
FIG. 14B is a front view of the solid electrolytic capacitor according to Embodiment 8.
Figure 14C:
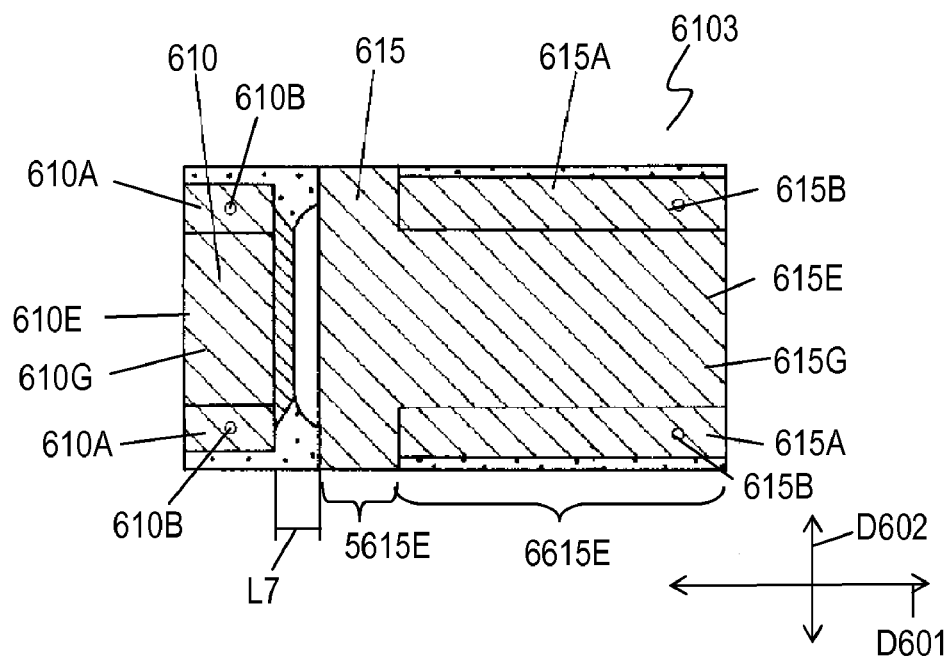
FIG. 14C is a bottom view of the solid electrolytic capacitor according to Embodiment 8.
Figure 14D:
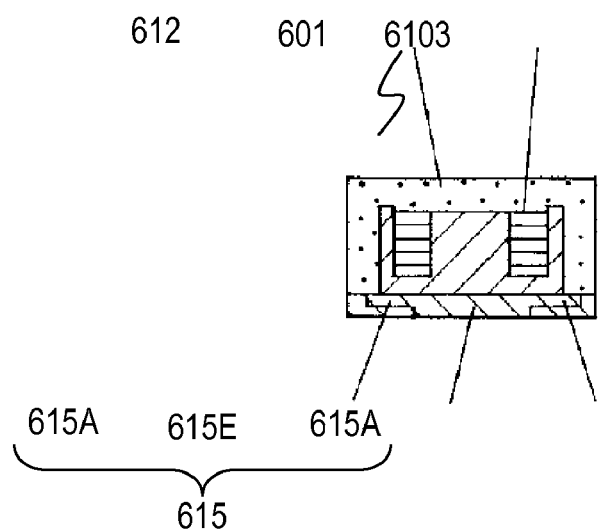
FIG. 14D is a side view of the solid electrolytic capacitor according to Embodiment 8.

FIGS. 14A to 14D show solid electrolytic capacitor 6103 according to Exemplary Embodiment 8 of this invention. FIG. 14B is a front view of solid electrolytic capacitor 6103. FIGS. 14A, 14C, and 14D are a plan view seen from direction XIVA, a bottom view seen from direction XIVC, and a side view seen from direction XIVD of solid electrolytic capacitor 6103 shown in FIG. 14B. The same components as those of Embodiment 6 will be denoted by the same reference numerals, and their detailed description will be omitted.

Lower surface 615G of cathode terminal 615 opposite to surface 615F facing capacitor elements 601 is arranged to be flush with lower surface 610G of anode terminal 610, and is positioned as close to lower surface 610G of anode terminal 610 as possible. Distance L7 of between surface 615G of cathode terminal 615 and surface 610G of anode terminal 610 is not less than 1 mm, and is preferably 1 mm. The distance being less than 1 mm may cause a current leakage across the surfaces. Cathode terminal 615 includes thick portion 615E having surface 615G, and thin portions 615A. Thin portions 615A are thinner than thick portion 615E, and are connected to both sides of thick portion 615E. Surface 615K of cathode terminal 615 opposite to surface 615F is covered with resin package 612 and does not expose, thus not functioning as a mounting surface to be mounted onto a mount body. Lower surface 615G of cathode terminal 615 extends to an end thereof opposite to anode terminal 610, and thin portions 615A are provided at two sides of cathode terminal 615 in direction D602 perpendicular to direction D601 in which anode terminal 610 and cathode terminal 615 are arranged. Thick portion 615E is provided between thin portions 615A so that thin portions 615A and thick portion 615E are arranged in direction D602. Thick portion 615E of cathode terminal 615 has portion 5615E facing anode terminal 610 and has portion 6615E extending from portion 5615E toward a direction opposite to anode terminal 610. Portion 6615E has a width narrower than that of portion 5615E. That is, thick portion 615E and surface 615G functioning as a mounting surface are arranged substantially in a "T" shape.

In anode terminal 610, thick portion 610E are provided between thin portions 610A, and thin portions 610A and thick portion 610E are arranged in direction D602.

In addition to advantages of solid electrolytic capacitor 6102 of Embodiment 7, solid electrolytic capacitor 6103 includes cathode terminal 615 easily manufactured, and is stably mountable to a mount body.

Solid electrolytic capacitor 6103 of Embodiment 8 has a small equivalent series resistance (ESR) and a small equivalent series inductance (ESL) similarly to solid electrolytic capacitor 6101 of Embodiment 6. The ESL of solid electrolytic capacitor 6103 of Embodiment 8 was 500 pH, which is one third of an ESL of 1500 pH of conventional solid electrolytic capacitor 1100 shown in FIGS. 22 to 24.

Exemplary Embodiment 9

Figure 15A:
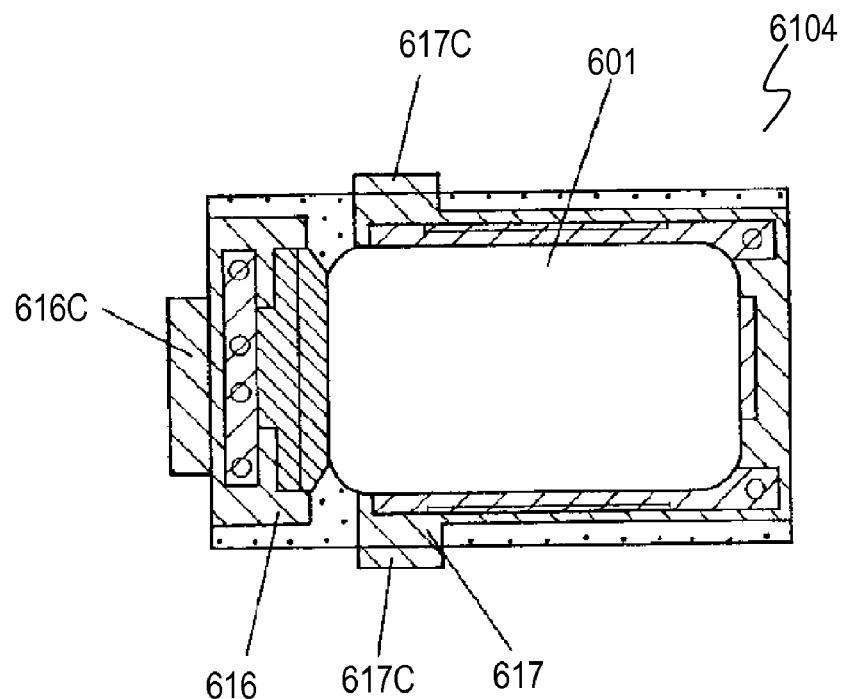
FIG. 15A is a plan view of a solid electrolytic capacitor according to Exemplary Embodiment 9 of the invention.
Figure 15B:
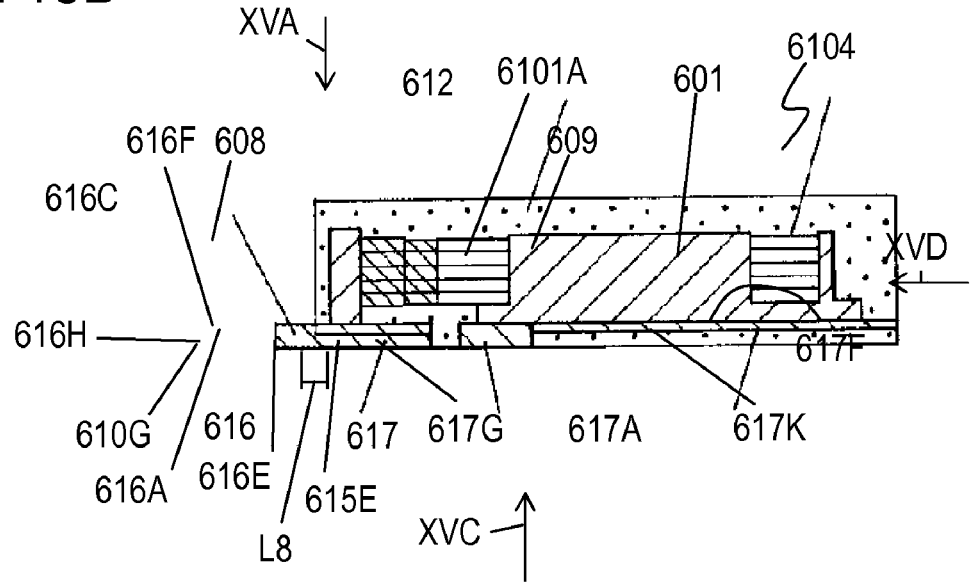
FIG. 15B is a front view of the solid electrolytic capacitor according to Embodiment 9.
Figure 15C:
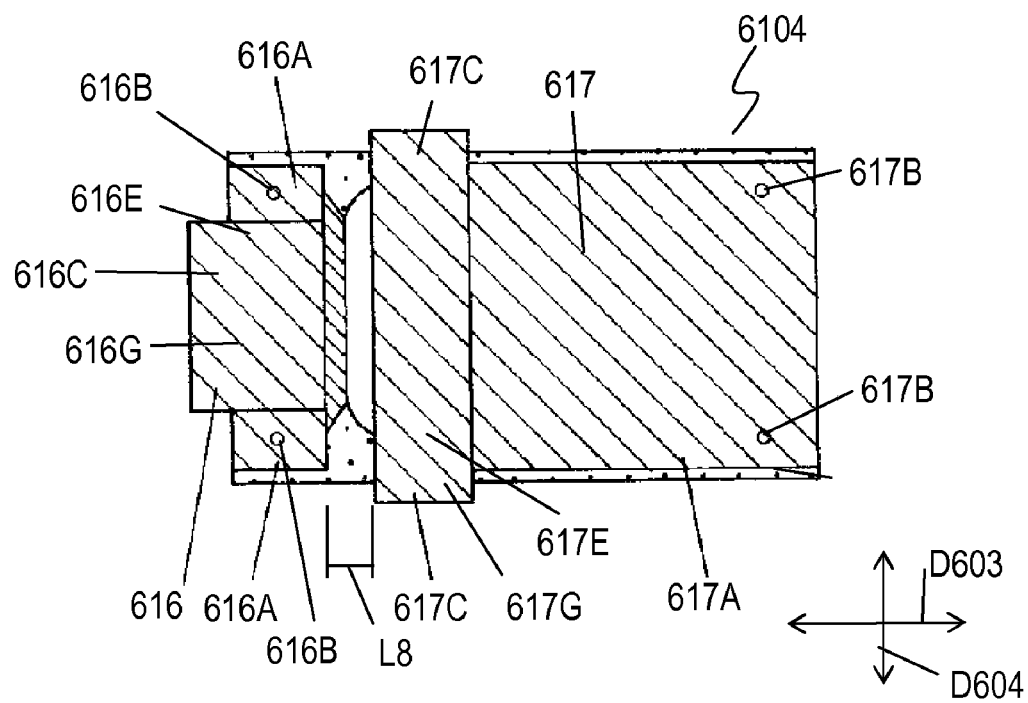
FIG. 15C is a bottom view of the solid electrolytic capacitor according to Embodiment 9.
Figure 15D:
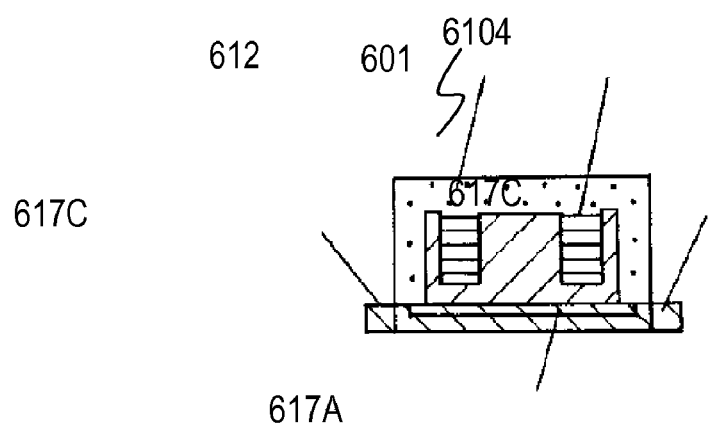
FIG. 15D is a side view of the solid electrolytic capacitor according to Embodiment 9.

FIGS. 15A to 15D show solid electrolytic capacitor 6104 according to Exemplary Embodiment 9 of the invention. FIG. 15B is a front view of solid electrolytic capacitor 6104. FIGS. 15A, 15C, and 15D are a plan view seen from direction XVA, a bottom view seen from direction XVC, and a side view seen from direction XVD of solid electrolytic capacitor 6104 shown in FIG. 15B. The same components as those of Embodiment 6 will be denoted by the same reference numerals, and their detailed description will be omitted.

Anode terminal 616 has thick portion 616E at the center thereof and thin portions 616A. Thin portions 616A are thinner than thick portion 616E, and are provided at both sides of thick portion 616E. Thin portions 616A in anode terminal 616 are formed by providing recesses 616H in surface 616G opposite to surface 616F facing capacitor elements 601. Surface 616F of anode terminal 616 including thick portion 616E and thin portions 616A is flat. Thin portions 616A have portions of surface 616F of anode terminal 616, and thick portion 616E has a portion of surface 616F. Anode lead frame 608 of capacitor element unit 6101A is placed on surface 616F of anode terminal 616, and is connected to anode terminal 616 at junctions 616B inside thin portions 616A by laser welding. Surface 616G of anode terminal 616 extends outward to provide protruding portion 616C protruding from resin package 612. Surface 616G functions a mounting surface when the capacitor is mounted onto a mount body, such as a wiring board.

Surface 617G of cathode terminal 617 opposite to surface 617F facing capacitor elements 601 is arranged to be flush with surface 616G of anode terminal 616. Surface 617G of cathode terminal 617 is positioned as close to surface 616G of anode terminal 616 as possible. Distance L8 between surface 617G of cathode terminal 617 and surface 616G of anode terminal 616 is not less than 1 mm, and preferably is 1 mm. The distance being less than 1 mm may cause a current leakage across the surfaces. Cathode terminal 617 includes thick portion 617E having surface 617G, and thin portion 617A. This portion 617A is thinner than thick portion 617E, and extends from thick portion 617E in a direction opposite to anode terminal 616. Surface 617F of cathode terminal 617 including thick portion 617E and thin portion 617A is flat. Thin portion 617A has a portion of surface 617F of cathode terminal 617, and thick portion 617E has a portion of surface 617F. Surface 617K of thin portion 617A opposite to surface 617F of thin portion 617A is covered with resin package 612 and does not expose, thus not functioning as a mounting surface arranged to be mounted on the mount body. Cathode lead frame 609 of capacitor element unit 6101A is placed on surface 617F of cathode terminal 617, and is connected to cathode terminal 617 at junctions 617B inside thin portion 617A by laser welding. Lower surface 617G functioning as a mounting surface of cathode terminal 617 extends so that thick portion 617E has protruding portions 617C protruding from resin package 612. That is, thick portion 617E extends so that the thick portion protrudes from resin package 612 in direction D604 perpendicular to direction D603 in which anode terminal 616 and cathode terminal 617 are arranged.

Protruding portion 616C of anode terminal 616 and protruding portions 617C of cathode terminal 617 allows solder fillets to be easily observable from above when capacitor 6104 is soldered to be mounting to the mount body, thereby providing the capacitor with a high reliability of soldering.

Exemplary Embodiment 10

Figure 16A:
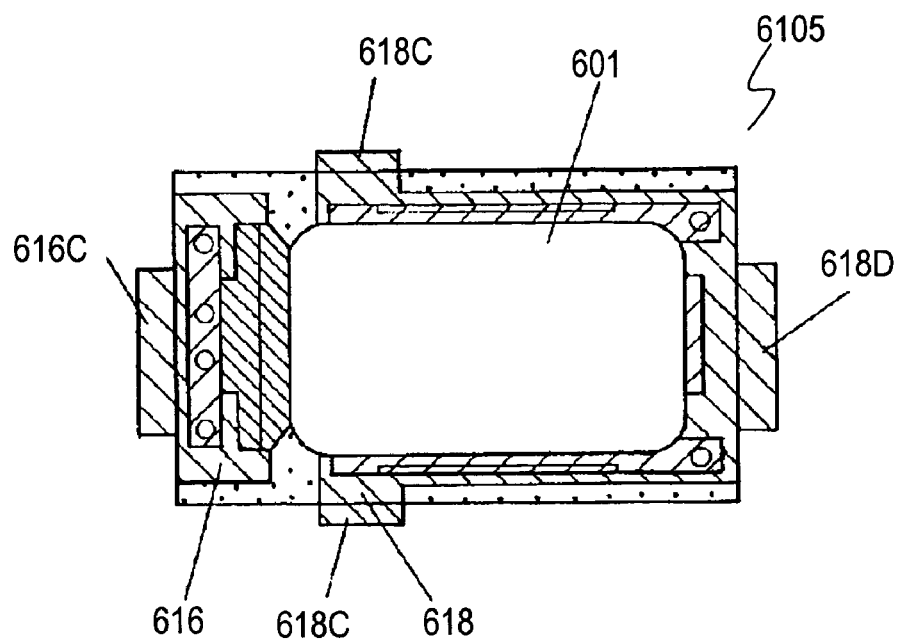
FIG. 16A is a plan view of a solid electrolytic capacitor according to Exemplary Embodiment 10 of the invention.
Figure 16B:
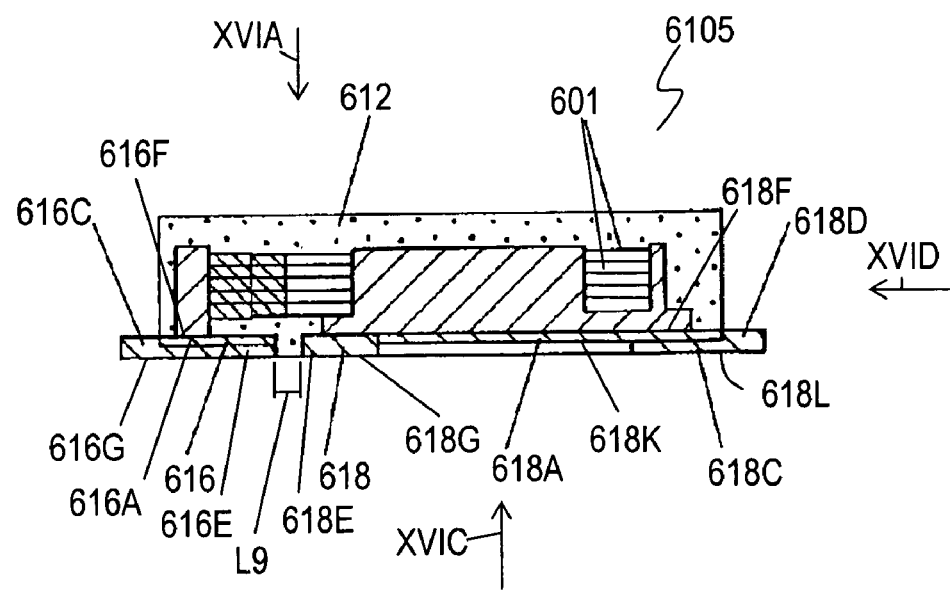
FIG. 16B is a front view of the solid electrolytic capacitor according to Embodiment 10.
Figure 16C:
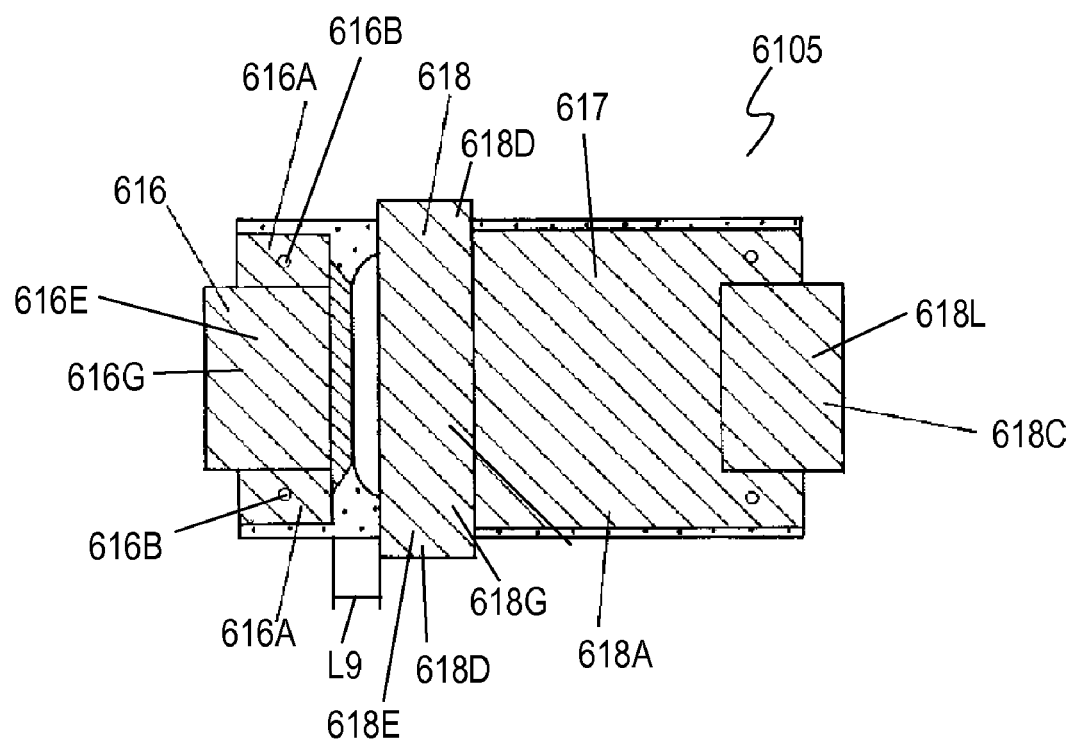
FIG. 16C is a bottom view of the solid electrolytic capacitor according to Embodiment 10.
Figure 16D:
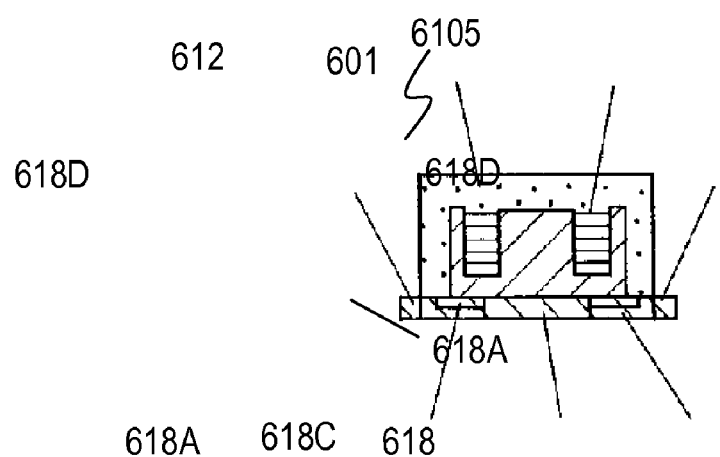
FIG. 16D is a side view of the solid electrolytic capacitor according to Embodiment 10.

FIGS. 16A to 16D show solid electrolytic capacitor 6105 according to Exemplary Embodiment 10 of this invention. FIG. 16B is a front view of solid electrolytic capacitor 6105. FIGS. 16A, 16C, and 16D are a plan view seen from direction XVIA, a bottom view seen from direction XVIC, and a side view seen from direction XVID of solid electrolytic capacitor 6105 shown in FIG. 16B. The same components as those of Embodiment 9 will be denoted by the same reference numerals, and their detailed description will be omitted.

Lower surface 618G of cathode terminal 618 is arranged to be flush with lower surface 616G of anode terminal 616, and is positioned as close to lower surface 616G of anode terminal 616 as possible. Distance L9 between surface 618G of cathode terminal 618 and surface 616G of anode terminal 616 is not less than 1 mm, and preferably is 1 mm. The distance being less than 1 mm may cause a current leakage across the surfaces. Surface 616G functions as a mounting surface when the capacitor is mounted onto a mount body, such as a wiring board. Cathode terminal 618 includes thick portion 618E having surface 618G, and thin portion 618A. Thin portion 618A is thinner than thick portion 618E, and extends from thick portion 618E in a direction opposite to anode terminal 616. Surface 618K of thin portion 618A opposite to a surface facing capacitor elements 601 is covered with resin package 612 and does not expose, thus not functioning as a mounting surface arranged to be mounted on the mount body. Cathode terminal 618 includes protruding portion 618D at an end of thin portion 618A opposite to anode terminal 616. Protruding portion 618D has lower surface 618L functioning as a mounting surface when the capacitor is mounted. Surface 618L is flush with surfaces 616G and 618G. Surface 618G functioning as a mounting surface of cathode terminal 618 extends outward, so that cathode terminal 618 has protruding portions 618C protruding from resin package 612. Thick portion 618E having surface 618G extends to provide protruding portion 618D protruding from resin package 612.

Solid electrolytic capacitor 6105 of Embodiment 10, protruding portion 616C of anode terminal 616 and protruding portions 618C and 618D of cathode terminal 618 allow solder fillets to be easily observable from above when capacitor 6105 is soldered to be mounted to the mount body, thereby providing a high reliability of soldering.

Exemplary Embodiment 11

Figure 17A:
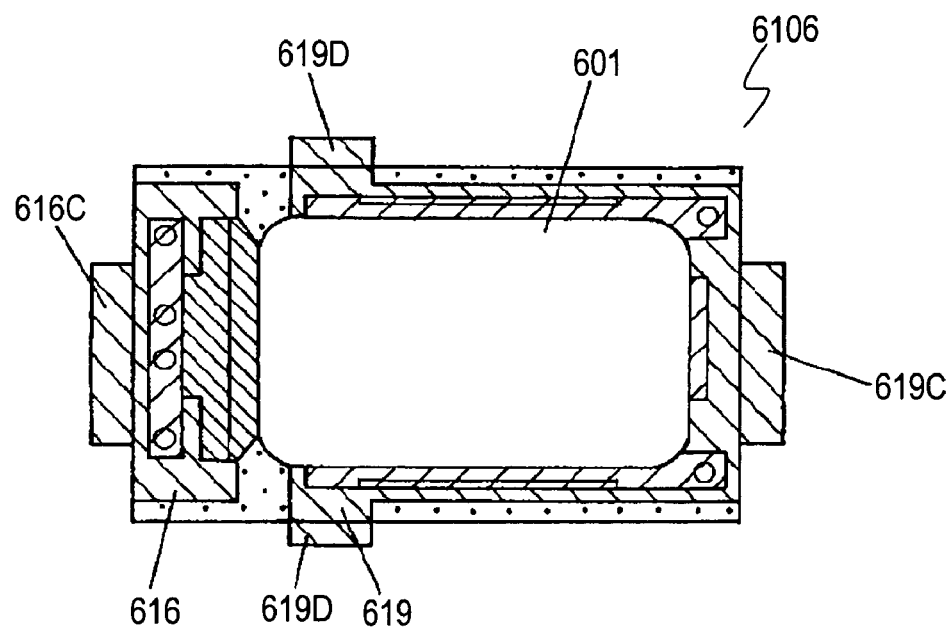
FIG. 17A is a plan view of a solid electrolytic capacitor according to Exemplary Embodiment 11 of the invention.
Figure 17B:
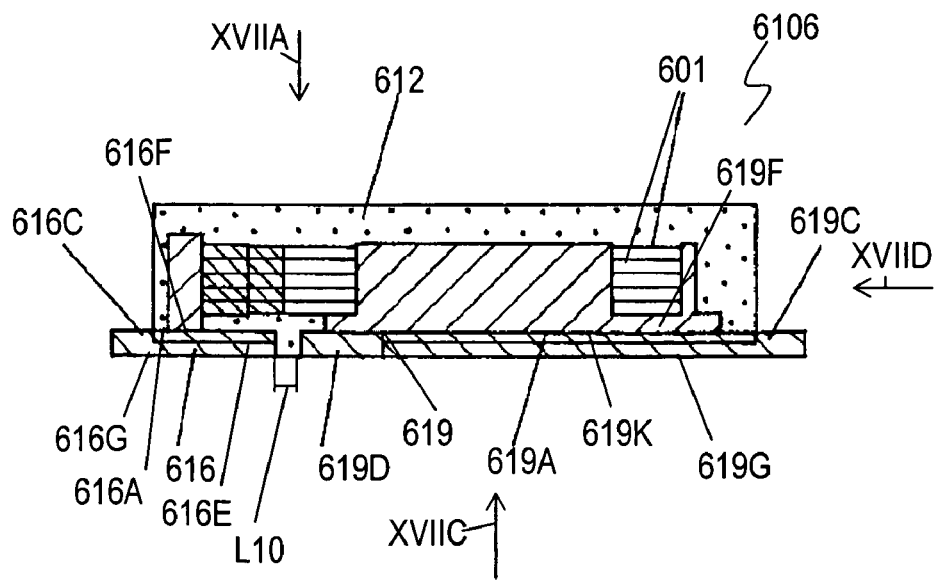
FIG. 17B is a front view of the solid electrolytic capacitor according to Embodiment 11.
Figure 17C:
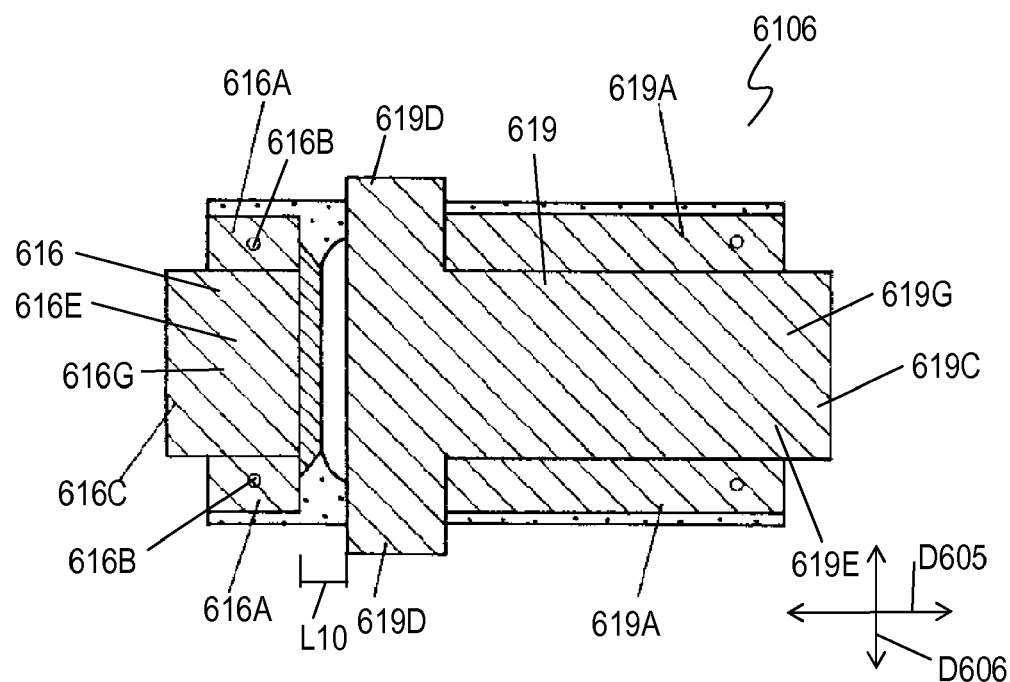
FIG. 17C is a bottom view of the solid electrolytic capacitor according to Embodiment 11.
Figure 17D:
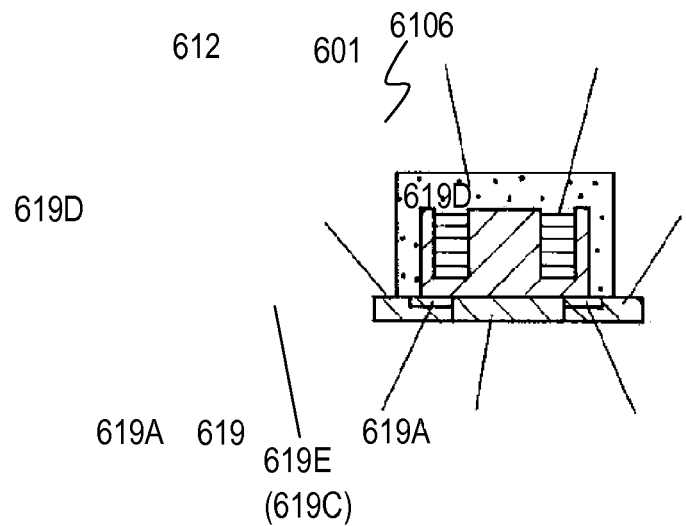
FIG. 17D is a side view of the solid electrolytic capacitor according to Embodiment 11.

FIGS. 17A to 17D show solid electrolytic capacitor 6106 according to Exemplary Embodiment 11 of this invention. FIG. 17B is a front view of solid electrolytic capacitor 6106. FIGS. 17A, 17C, and 17D are a plan view seen from direction XVIIA, a bottom view seen from direction XVIIC, and a side view seen from direction XVIID of solid electrolytic capacitor 6106 shown in FIG. 17B. The same components as those of Embodiment 8 will be denoted by the same reference numerals, and their detailed description will be omitted.

Lower surface 619G of cathode terminal 619 opposite to surface 619F facing capacitor elements 601 is arranged to be flush with lower surface 616G of anode terminal 616, and is positioned as close to lower surface 616G of anode terminal 616 as possible. Distance L10 between surface 619G of cathode terminal 619 and surface 616G of anode terminal 616 is less than 1 mm, and preferably is 1 mm. The distance being less than 1 mm may cause a current leakage across the surfaces. Surface 616G functions as a mounting surface when the capacitor is mounted to a mount body, such as a wiring board. Cathode terminal 619 includes thick portion 619E having surface 619G, and thin portions 619A. Thin portions 619A are thinner than thick portion 619E, and are connected to both sides of thick portion 619E. Surfaces 619K of thin portions 619A of cathode terminal 619 opposite to surface 619F is covered with resin package 612 and does not expose, thus not functioning as a mounting surface arranged to be mounted to the mount body. Lower surface 619G of cathode terminal 619 extends to an end thereof opposite to anode terminal 616, and thin portions 619A are provided at two sides of cathode terminal 619 in direction D606 perpendicular to direction D605 in which anode terminal 616 and cathode terminal 619 are arranged. That is, thick portion 619E and lower surface 619G functioning as a mounting surface of cathode terminal 619 are arranged substantially in a "T", as sown in FIG. 17C. Thick portion 619E having lower surface 619G functioning as the mounting surface of cathode terminal 619 extends outward to provide protruding portions 619C and 619D protruding from resin package 612. That is, thick portion 619E includes protruding portions 619C and 619D which extend in directions D605 and D606 perpendicular to direction D605 in which anode terminal 616 and cathode terminal 619 are arranged, respectively.

Protruding portion 616C of anode terminal 616 and protruding portions 619C and 619D of cathode terminal 619 allows solder fillets to be easily observable from above when capacitor 6106 is soldered to be mounting to the mount body, thereby providing a high reliability of soldering.

Exemplary Embodiment 12

Figure 18A:
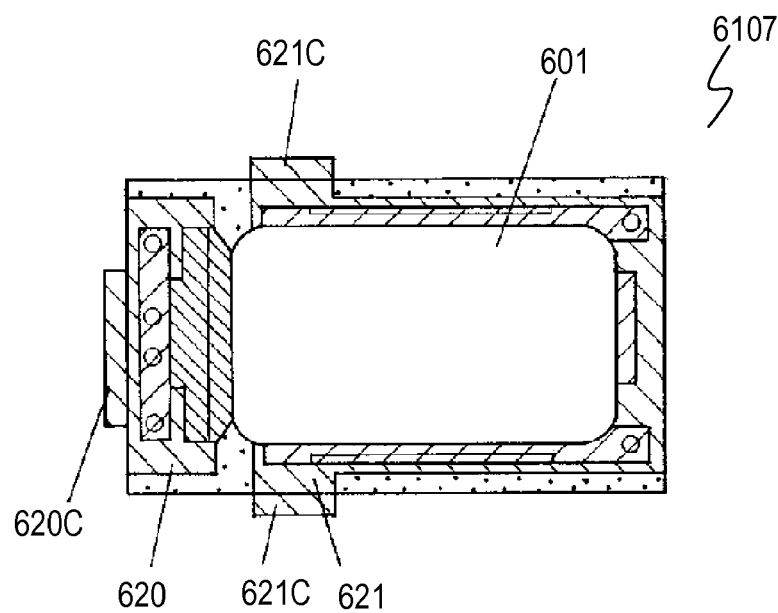
FIG. 18A is a plan view of a solid electrolytic capacitor according to Exemplary Embodiment 12 of the invention.
Figure 18B:
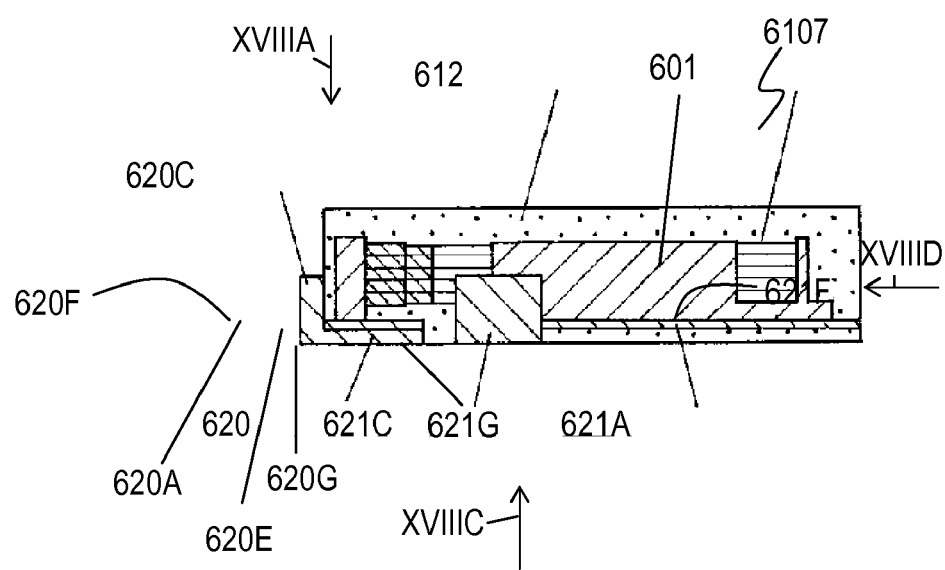
FIG. 18B is a front view of the solid electrolytic capacitor according to Embodiment 12.

FIGS. 18A to 18D show solid electrolytic capacitor 6107 according to Exemplary Embodiment 12 of this invention. FIG. 18B is a front view of solid electrolytic capacitor 6107.

Figure 18C:
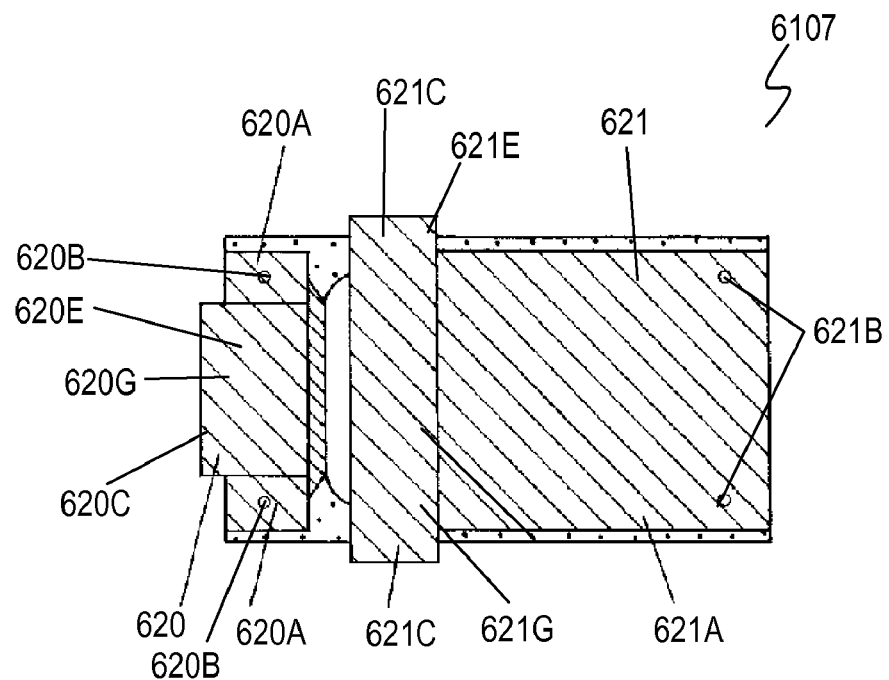
FIG. 18C is a bottom view of the solid electrolytic capacitor according to Embodiment 12.
Figure 18D:
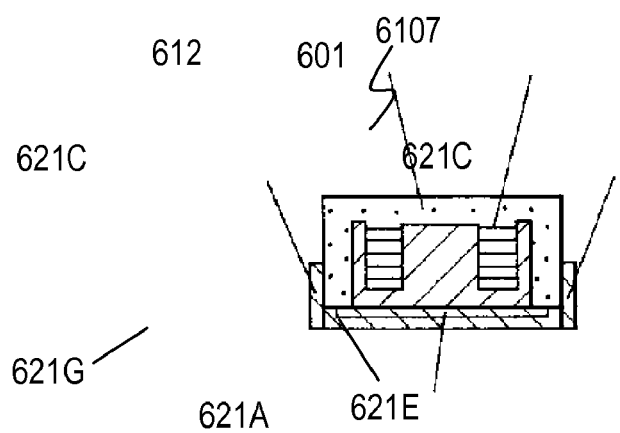
FIG. 18D is a side view of the solid electrolytic capacitor according to Embodiment 12.

FIGS. 18A, 18C, and 18D are a plan view seen from direction XVIIIA, a bottom view seen from direction XVIIIC, and a side view seen from direction XVIIID of solid electrolytic capacitor 6107 shown in FIG. 18B. The same components as those of embodiment 9 will be denoted by the same reference numerals, and their detailed description will be omitted.

Anode terminal 620 has thick portion 620E at the center thereof and thin portions 620A. Thin portions 620A are thinner than thick portion 620E, and are provided at both sides of thick portion 620E. Surface 620F of anode terminal 620 including thick portion 620E and thin portions 620A is flat. Thin portions 620A have portions of surface 620F of anode terminal 620, and thick portion 620E has a portion of surface 620F. Anode lead frame 608 of capacitor element unit 6101A is placed on surface 620F of anode terminal 620, and is connected to anode terminal 620 at junctions 620B inside thin portions 620A by laser welding. Surface 620G of anode terminal 620 extending outward provides protruding portion 620C protruding from resin package 612. Protruding portion 620C is bent upward along a side surface (i.e., an exterior surface) of resin package 612, so as to have a shape extending along an exterior of resin package 612.

Surface 621G of cathode terminal 621 opposite to surface 621F facing capacitor elements 601 is arranged to be flush with surface 620G of anode terminal 620. Cathode terminal 621 includes thick portion 621E having surface 621G, and thin portion 621A. Thin portion 621A is thinner than thick portion 621E, and extends from thick portion 621E in a direction opposite to anode terminal 620. Surface 621F of cathode terminal 621 including thick portion 621E and thin portion 621A is flat. Thin portion 621A has a portion of surface 621F of cathode terminal 621, and thick portion 621E has a portion of surface 621F. Cathode lead frame 609 of capacitor element unit 6101A is placed on surface 621F of cathode terminal 621, and is connected to cathode terminal 621 at junctions 621B inside thin portion 621A by laser welding. Thick portion 621E having lower surface 621G functioning as a mounting surface of cathode terminal 621 extends to outside of resin package 512 to provide protruding portions 621C. Protruding portions 621C are bent upward along side surfaces (exterior surfaces) of resin package 612, so as to have shapes extending along an exterior of resin package 612.

Protruding portion 620C of anode terminal 620 and protruding portions 621C of cathode terminal 621 allows solder fillets to be easily observable from above when capacitor 6107 is soldered to be mounted to a mount body, thereby providing the capacitor with a high reliability of soldering.

Figure 18E:
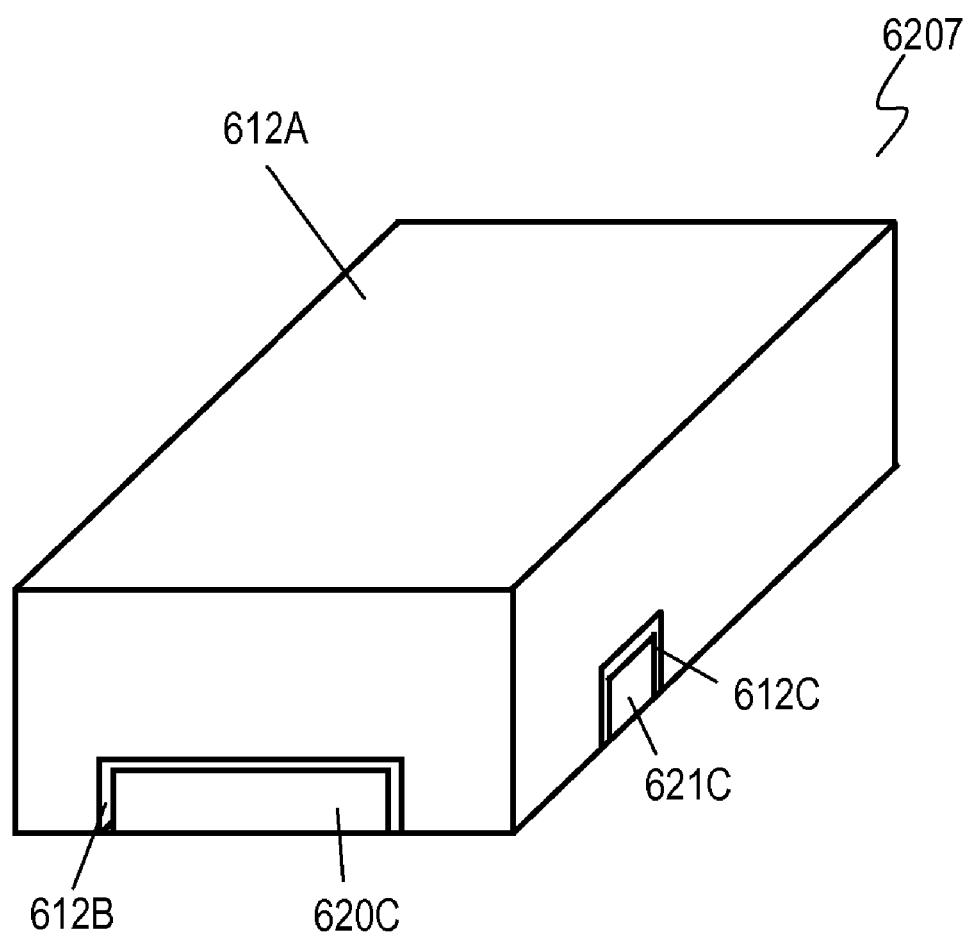
FIG. 18E is a perspective view of another solid electrolytic capacitor according to Embodiment 12.

FIG. 18E is a perspective view of another solid electrolytic capacitor 6207 according to Embodiment 12. Solid electrolytic capacitor 6207 includes resin package 612A having a shape different from that of resin package 612 of solid electrolytic capacitor 6107, while other components are identical to those of capacitor 6107. Resin package 612A has recesses 612B and 612C in which protruding portion 620C of anode terminal 620 and protruding portions 621C of cathode terminal 621 are positioned, respectively. This structure allows solid electrolytic capacitor 6207 to have s small size without increasing its dimensions.

Exemplary Embodiment 13

Figure 19A:
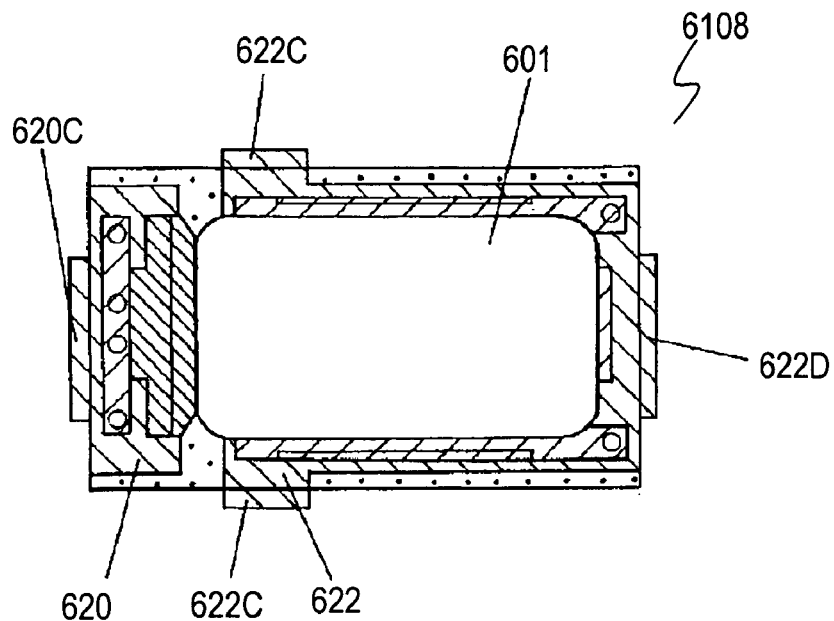
FIG. 19A is a plan view of a solid electrolytic capacitor according to Exemplary Embodiment 13 of the invention.
Figure 19B:
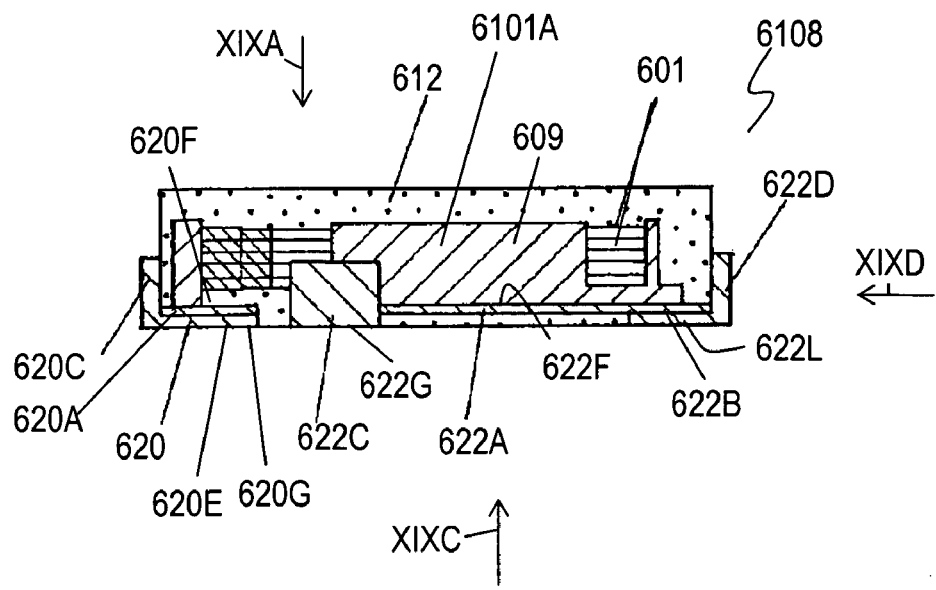
FIG. 19B is a front view of the solid electrolytic capacitor according to Embodiment 13.

FIGS. 19A to 19D show solid electrolytic capacitor 6108 according to Exemplary Embodiment 13 of this invention. FIG. 19B is a front view of solid electrolytic capacitor 6108.

Figure 19C:
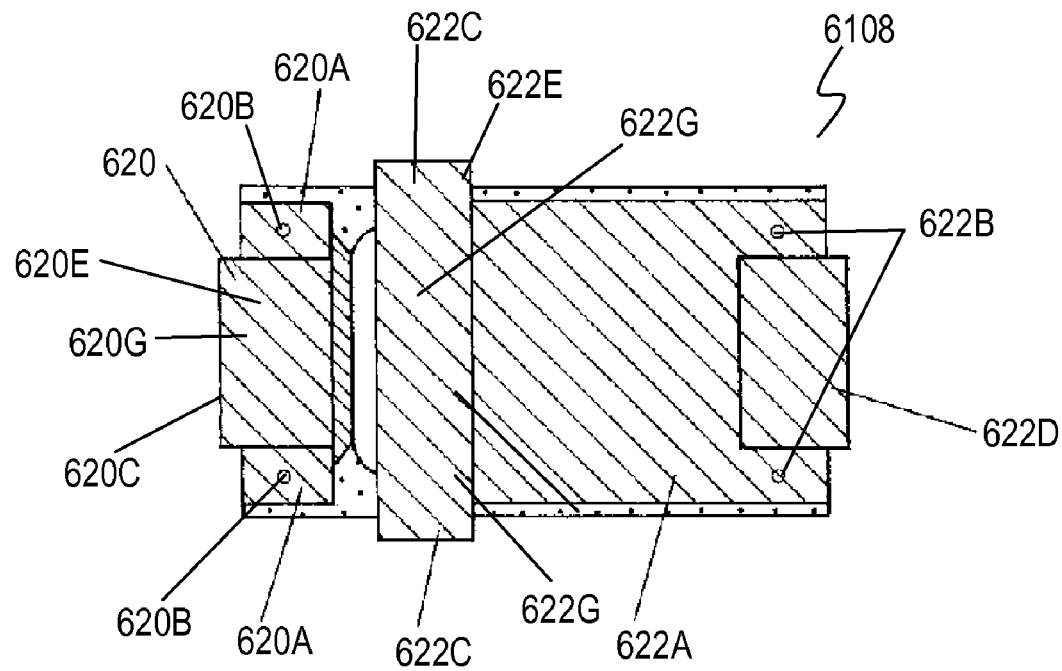
FIG. 19C is a bottom view of the solid electrolytic capacitor according to Embodiment 13.
Figure 19D:
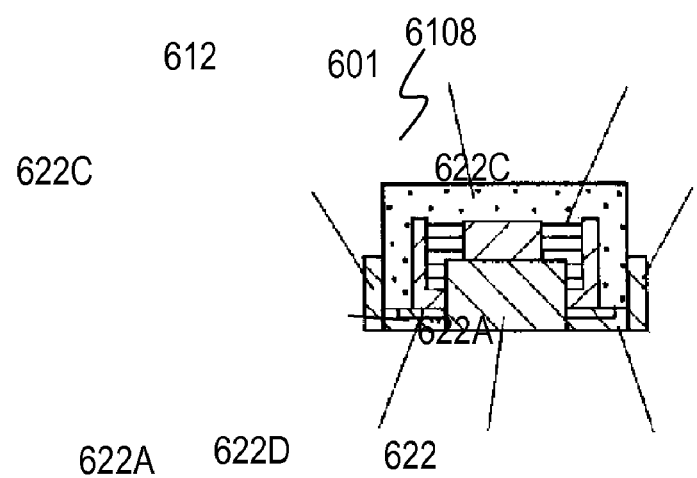
FIG. 19D is a side view of the solid electrolytic capacitor according to Embodiment 13.

FIGS. 19A, 19C, and 19D are a plan view seen from direction XIXA, a bottom view seen from direction XIXC, and a side view seen from direction XIXD of solid electrolytic capacitor 6108 shown in FIG. 19B. The same components as those of Embodiment 12 will be denoted by the same reference numerals, and their detailed description will be omitted.

Surface 622G of cathode terminal 622 opposite to surface 622F facing capacitor elements 601 is arranged to be flush with surface 620G of anode terminal 620. Cathode terminal 622 includes thick portion 622E having surface 622G, and thin portion 622A. Thin portion 622A is thinner than thick portion 622E, and extends from thick portion 622E in a direction opposite to anode terminal 620. Surface 622F of cathode terminal 622 including thick portion 622E and thin portion 622A is flat. Thin portion 622A has a portion of surface 622F of cathode terminal 622, and thick portion 622E has a portion of surface 622F. Cathode lead frame 609 of capacitor element unit 6101A is placed on surface 622F of cathode terminal 622, and is connected to cathode terminal 622 at junctions 622B inside thin portion 622A by laser welding. Thick portion 622E having lower surface 622G functioning as a mounting surface of cathode terminal 622 extends outside of resin package 612 to provide protruding portions 622C. Protruding portions 622C are bent upward along side surfaces (exterior surfaces) of resin package 612, so as to have shapes extending along an exterior of resin package 612. Cathode terminal 622 includes protruding portion 622D having lower surface 622L functioning as a mounting surface when the capacitor is mounted. Protruding portion 622D extends from resin package 612 at an end of thin portion 622A opposite to anode terminal 620. Surface 622L is flush with surfaces 620G and 622G. Protruding portion 622D is bent upward along the side surfaces (the exterior surfaces) of resin package 612, so as to have a shape extending along the exterior of resin package 612.

In solid electrolytic capacitor 6108 of Embodiment 13, protruding portion 620C of anode terminal 620 and protruding portions 622C and 622D of cathode terminal 622 allows solder fillets to be easily observable from above when capacitor 6108 is soldered to be mounted to the mount body, thereby providing the capacitor with a high reliability of soldering.

Similarly to solid electrolytic capacitor 6207 shown in FIG. 18E, resin package 612 may have recesses provided therein in which protruding portions 620C, 622C, and 622D extended from the exterior of resin package 612 are positioned, thereby allowing the capacitor to have a small size.

Exemplary Embodiment 14

Figure 20A:
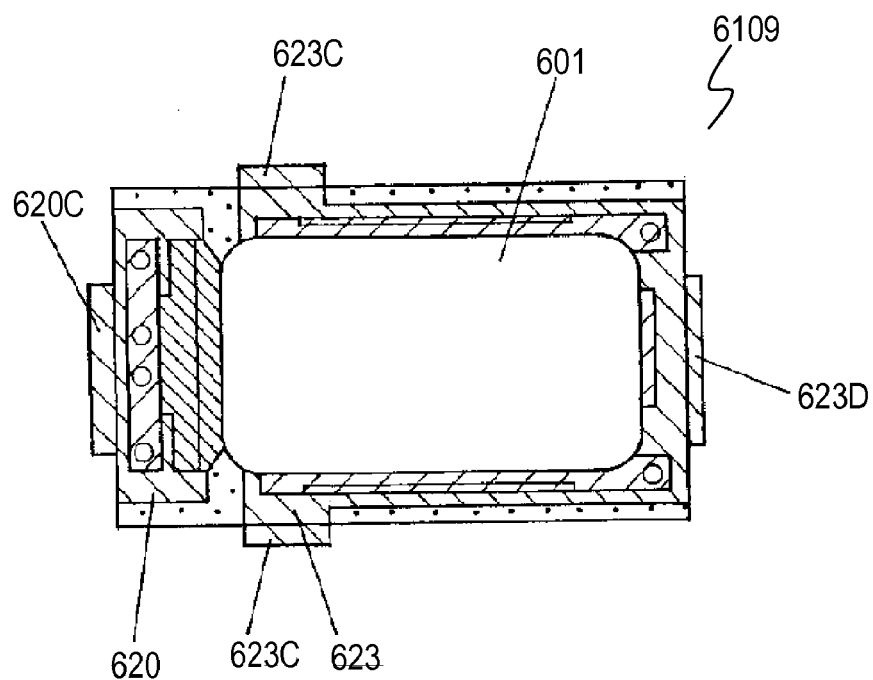
FIG. 20A is a plan view of a solid electrolytic capacitor according to Exemplary Embodiment 14 of the invention.
Figure 20B:
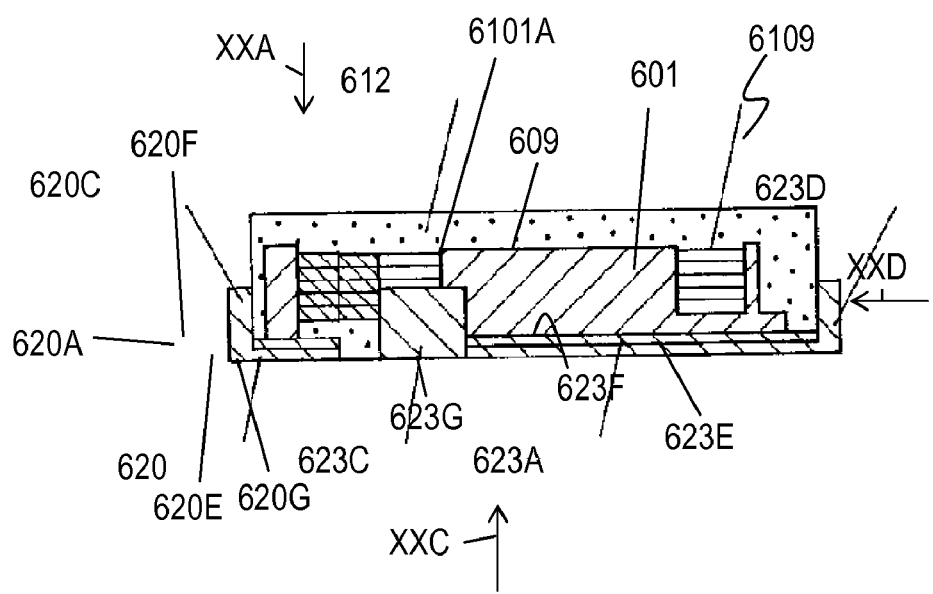
FIG. 20B is a front view of the solid electrolytic capacitor according to Embodiment 14.
Figure 20C:
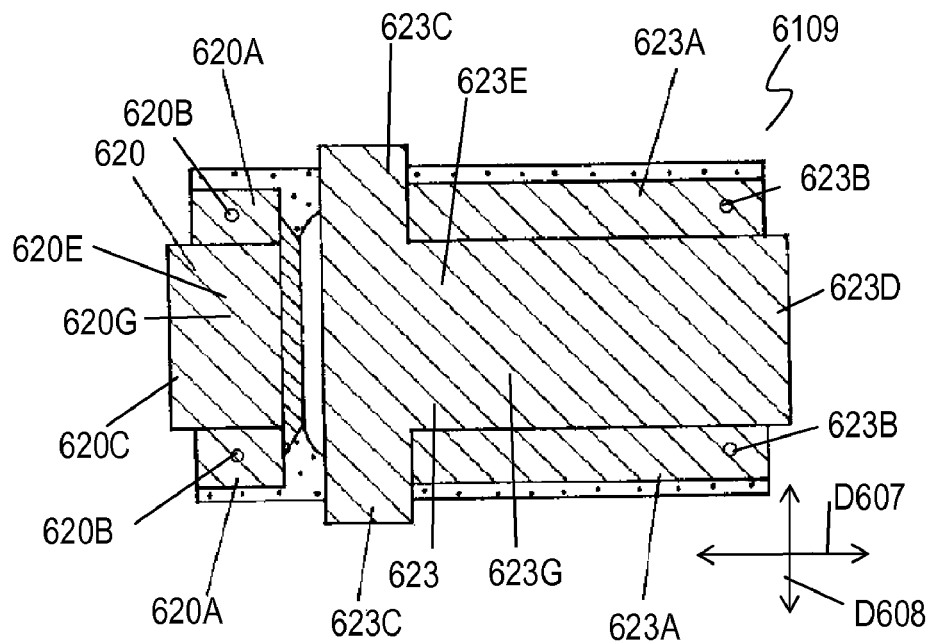
FIG. 20C is a bottom view of the solid electrolytic capacitor according to Embodiment 14.
Figure 20D:
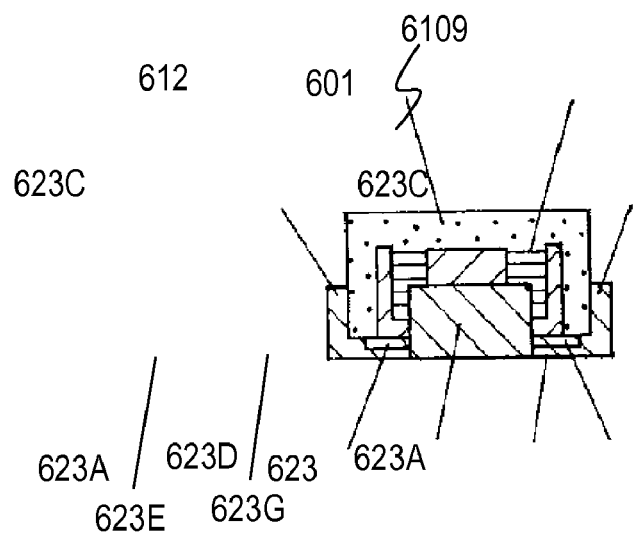
FIG. 20D is a side view of the solid electrolytic capacitor according to Embodiment 14.

FIGS. 20A to 20D show solid electrolytic capacitor 6109 according to Exemplary Embodiment 14 of this invention. FIG. 20B is a front view of solid electrolytic capacitor 6109. FIGS. 20A, 20C, and 20D are a plan view seen from direction XXA, a bottom view seen from direction XXC, and a side view seen from direction XXD of solid electrolytic capacitor 6109 shown in FIG. 20B. The same components as those of Embodiment 13 will be denoted by the same reference numerals, and their detailed description will be omitted.

Lower surface 623G of cathode terminal 623 opposite to upper surface 623F facing capacitor elements 601 is arranged to be flush with lower surface 620G of anode terminal 620. Lower surface 620G functions as a mounting surface arranged to be mounted onto a mount body, such as a wiring board. Cathode terminal 623 includes thick portion 623E having surface 623G, and thin portions 623A. Thin portions 623A are thinner than thick portion 623E, and are connected to both sides of thick portion 623E. Surface 623F of cathode terminal 623 including thick portion 623E and thin portions 623A is flat. Thin portions 623A have portions of surface 623F of cathode terminal 623, and thick portion 623E has a portion of surface 623F. Lower surface 623G of cathode terminal 623 extends to an end thereof opposite to anode terminal 620, and thin portions 623A are provided at two sides of cathode terminal 623 in direction D608 perpendicular to direction D607 in which anode terminal 620 and cathode terminal 623 are arranged. That is, thick portion 623E and lower surface 623G functioning as a mounting surface of cathode terminal 623 are arranged substantially in a "T" shape, as shown in FIG. 20C. Thick portion 623E having lower surface 623G functioning as the mounting surface of cathode terminal 623 extends outward to provide protruding portions 623C and 623D protruding from resin package 612. That is, thick portion 623E includes protruding portions 623C and 623D which extend in directions D607 and D608 perpendicular to direction D607 in which anode terminal 620 and cathode terminal 623 are arranged, respectively. Protruding portions 623C and 623D are bent upward along side surfaces (exterior surfaces) of resin package 612, so as to have shapes extending along an exterior of resin package 612.

In solid electrolytic capacitor 6109 of Embodiment 14, protruding portion 620C of anode terminal 620 and protruding portions 623C and 623D of cathode terminal 623 allow solder fillets to be easily observable from above when capacitor 6109 is soldered to be mounted to the mount body, thereby providing the capacitor with a high reliability of soldering.

Similarly to solid electrolytic capacitor 6207 shown in FIG. 18E, resin package 612 may have recesses provided therein in which protruding portions 620C, 623C, and 623D extending from resin package 612 are positioned, thereby allowing the capacitor to have a small size.

Exemplary Embodiment 15

Figure 21A:
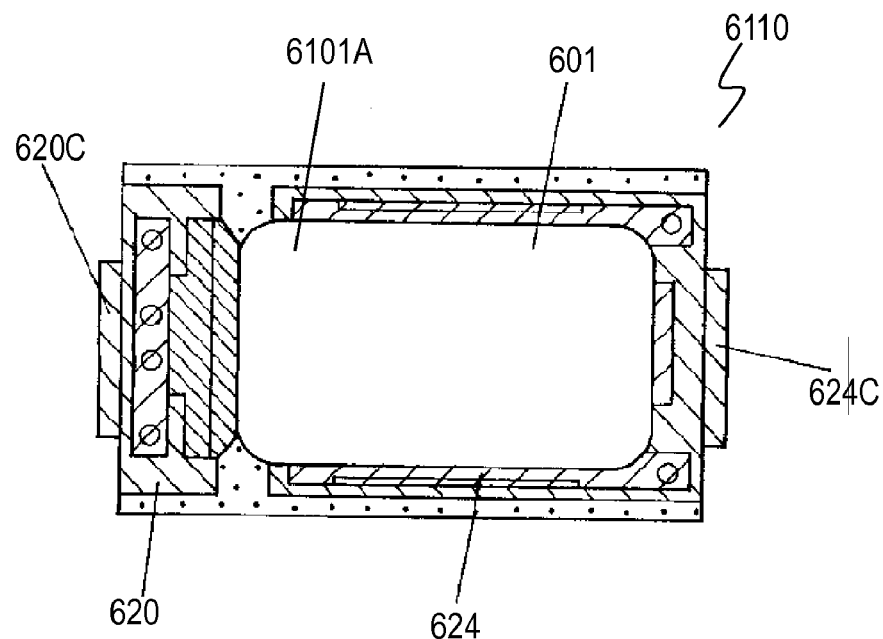
FIG. 21A is a plan view of a solid electrolytic capacitor according to Exemplary Embodiment 15 of the invention.
Figure 21B:
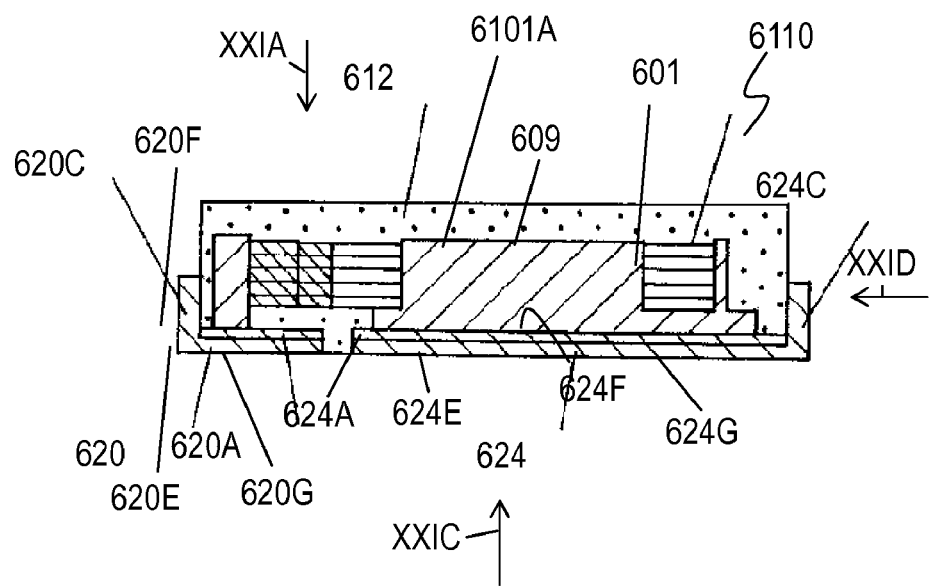
FIG. 21B is a front view of the solid electrolytic capacitor according to Embodiment 15.
Figure 21C:
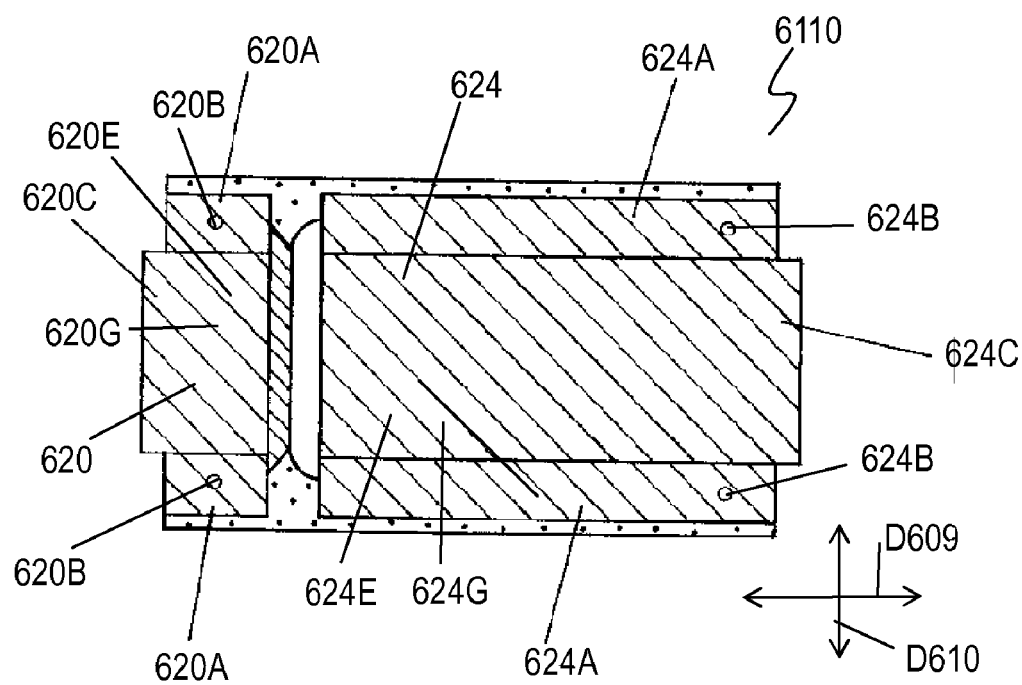
FIG. 21C is a bottom view of the solid electrolytic capacitor according to Embodiment 15.
Figure 21D:
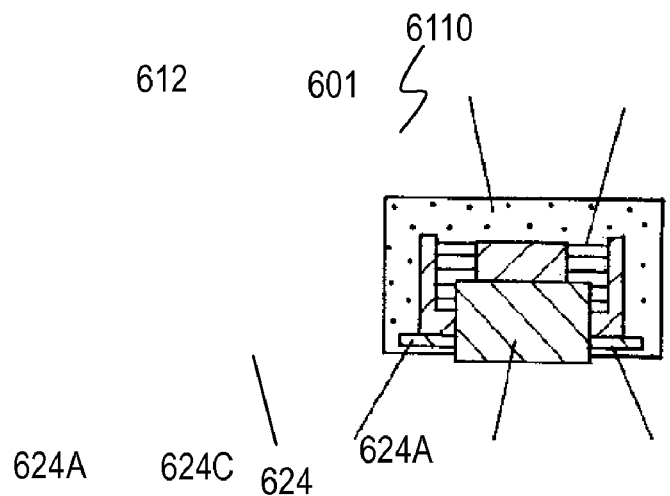
FIG. 21D is a side view of the solid electrolytic capacitor according to Embodiment 15.

FIGS. 21A to 21D show solid electrolytic capacitor 6110 according to Exemplary Embodiment 15 of this invention. FIG. 21B is a front view of solid electrolytic capacitor 6110. FIGS. 21A, 21C, and 21D are a plan view seen from direction XXIA, a bottom view seen from direction XXIC, and a side view seen from direction XXID of solid electrolytic capacitor 6110 shown in FIG. 21B. The same components as those of Embodiment 14 will be denoted by the same reference numerals, and their detailed description will be omitted.

Lower surface 624G of cathode terminal 624 opposite to upper surface 624F facing capacitor elements 601 is arranged to be flush with lower surface 620G of anode terminal 620. Lower surface 620G functions as a mounting surface arranged to be mounted onto a mount body, such as a wiring board. Cathode terminal 624 includes with thick portion 624E having surface 624G, and thin portions 624A. Thin portions 624A are thinner than thick portion 624E, and are connected to both sides of thick portion 624E. Lower surface 624G of cathode terminal 624 extends to an end thereof opposite to anode terminal 620, and thin portions 624A are provided at two sides of cathode terminal 624 in direction D610 perpendicular to direction D609 in which anode terminal 620 and cathode terminal 624 are arranged. Surface 624F of cathode terminal 624 including thick portion 624E and thin portions 624A is flat. Thin portions 624A have portions of surface 624F of cathode terminal 624, and thick portion 624E has a portion of surface 624F. Thick portion 624E having lower surface 624G functioning as the mounting surface of cathode terminal 624 extends outward to provide protruding portion 624C protruding from resin package 612. That is, thick portion 624E includes protruding portion 624C protruding from resin package 612 in direction D609 in which anode terminal 620 and cathode terminal 624 are arranged.

In addition to advantages of solid electrolytic capacitor 6109 of Embodiment 14, solid electrolytic capacitor 6110 of Embodiment 15 includes cathode terminal 624 easily manufactured, and allows the capacitor to be stably mountable to the mount body.

INDUSTRIAL APPLICABILITY

A solid electrolytic capacitor has a small equivalent series inductance, and is stably mountable to a mount body.

The invention claimed is:
1. A solid electrolytic capacitor comprising:
 a capacitor element including
  an anode body made of valve metal having a rough surface,
  a dielectric oxide layer provided on the surface of the anode body,
  a resist having an insulating property provided on the dielectric oxide layer, the resist dividing the anode body and the dielectric oxide layer into a cathode portion and an anode portion,
  a solid electrolyte layer made of conductive polymer provided on the dielectric layer at the cathode portion, and
  a cathode layer provided on the solid electrolyte layer;
 another capacitor element stacked on the capacitor element, the another capacitor element including another anode portion and another cathode layer;
 an anode terminal having a flat plate shape having a first surface and a second surface opposite to the first surface of the anode terminal, the first surface of the anode terminal being connected to the anode portion;
 an anode lead frame for joining the anode portion of the capacitor element with the another anode portion of the another capacitor element, the anode lead frame being connected to the first surface of the anode terminal;
 a cathode terminal having a flat plate shape having a first surface and a second surface opposite to the first surface of the cathode terminal, the first surface of the cathode terminal being connected to the cathode layer, the second surface of the cathode terminal being flush with the second surface of the anode terminal;
 a cathode lead frame for joining the cathode layer of the capacitor element with the another cathode layer of the another capacitor element, the cathode lead frame being connected to the first surface of the cathode terminal; and
 a resin package having an insulating property for accommodating the capacitor element, the anode terminal, and the cathode terminal, the resin package allowing the second surface of the anode terminal and the second surface of the cathode terminal to expose to an outside of the resin package,
 wherein the anode terminal includes a first thick portion and a first thin portion thinner than the first thick portion, the first thick portion having the second surface of the anode terminal and a portion of the first surface of the anode terminal, the first thin portion having a portion of the first surface of the anode terminal and being connected to the first thick portion, and wherein the cathode terminal includes a second thick portion and a second thin portion thinner than the second thick portion, the second thick portion having the second surface of the cathode terminal and a portion of the first surface of the cathode terminal, the second thin portion having a portion of the first surface and being connected to the second thick portion.

2. The solid electrolytic capacitor of claim 1, wherein the anode lead frame is connected to the anode terminal at the first thin portion.

3. The solid electrolytic capacitor of claim 1, wherein the cathode lead frame is connected to the cathode terminal at the second thin portion.

4. The solid electrolytic capacitor of claim 1, wherein the cathode lead frame includes a guide for positioning the capacitor element and the another capacitor element.

5. The solid electrolytic capacitor of claim 1, wherein a difference between respective thicknesses of the first thick portion and the first thin portion of the anode terminal is not less than 80 μm.

6. The solid electrolytic capacitor of claim 1, wherein a difference between respective thicknesses of the second thick portion and the second thin portion of the cathode terminal is not less than 80 μm.

7. The solid electrolytic capacitor of claim 1, wherein the anode terminal and the cathode terminal are made of a metal plate etched.

8. The solid electrolytic capacitor of claim 1, wherein the valve metal comprises one selected from the group consisting of aluminum, tantalum, niobium, and combination thereof.

9. The solid electrolytic capacitor of claim 1, wherein a distance between the cathode terminal and the anode terminal is not less than 1 mm.

10. The solid electrolytic capacitor of claim 9, wherein the distance between the cathode terminal and the anode terminal is 1 mm.

11. The solid electrolytic capacitor of claim 1, wherein the second surface of the cathode terminal and the second surface of the anode terminal are arranged to be mounted on a mount body.

12. The solid electrolytic capacitor of claim 1, wherein the anode terminal includes a protruding portion protruding from the resin package, and the protruding portion has a portion of the second surface of the anode terminal.

13. The solid electrolytic capacitor of claim 12, wherein the protruding portion of the anode terminal extends along an exterior surface of the resin package.

14. The solid electrolytic capacitor of claim 1, wherein the cathode terminal includes a protruding portion protruding from the resin package, and the protruding portion has a portion of the second surface of the cathode terminal.

15. The solid electrolytic capacitor of claim 14, wherein the protruding portion of the cathode terminal extends along an exterior surface of the resin package.

16. The solid electrolytic capacitor of claim 1,
wherein the cathode terminal further includes a third thin portion thinner than the second thick portion, the third thin portion having a portion of the first surface of the cathode terminal and being connected to the second thick portion,
wherein the anode terminal and the cathode terminal are arranged in a first direction, and
wherein the second thick portion is provided between the second thin portion and the third thin portion of the cathode terminal, so that the second thin portion, the third thin portion, and the second thick portion are arranged in a second direction perpendicular to the first direction.

17. The solid electrolytic capacitor of claim 16, wherein a difference between respective thicknesses of the second thick portion and the third thin portion of the cathode terminal is not less than 80 μm.

18. The solid electrolytic capacitor of claim 1,
wherein the anode terminal further includes a third thin portion thinner than the first thick portion, the third thin portion having a portion of the first surface of the anode terminal and being connected to the first thick portion,
wherein the anode terminal and the cathode terminal are arranged in a first direction, and
wherein the first thick portion is provided between the first thin portion and the third thin portion of the anode terminal, so that the first thin portion, the third thin portion, and the first thick portion are arranged in a second direction perpendicular to the first direction.

19. The solid electrolytic capacitor of claim 18, wherein a difference between respective thicknesses of the first thick portion and the third thin portion of the anode terminal is not less than 80 μm.

20. The solid electrolytic capacitor of claim 1,
wherein the second thick portion of the cathode terminal faces the anode terminal, and
wherein the second thin portion of the cathode terminal extends from the second thick portion in a direction opposite to the anode terminal.

21. The solid electrolytic capacitor of claim 1, wherein the cathode terminal further includes a mounting portion provided at an end of the second thin portion opposite to the second thick portion, the mounting portion having a surface being flush with the second surface of the cathode terminal.

22. The solid electrolytic capacitor of claim 1,
wherein the second thick portion of the cathode terminal having substantially a "T" shape, and the second thick portion includes
a first portion facing the anode terminal, and
a second portion extending from the first portion in a direction opposite to the anode terminal, the second portion having a width narrower than a width of the first portion.

23. The solid electrolytic capacitor of claim 22,
wherein the anode terminal and the cathode terminal are arranged in a first direction,
wherein the cathode terminal further includes a third thin portion thinner than the second thick portion, the third thin portion having a portion of the first surface of the cathode terminal and being connected to the second thick portion, and
wherein the second thick portion of the cathode terminal is provided between the second thin portion and the third thin portion, so that the second thin portion, the third thin portion, and the second portion of the second thick portion are arranged in a second direction perpendicular to the first direction.

24. The solid electrolytic capacitor of claim 22, wherein the cathode terminal further includes a protruding portion extending from the first portion of the second thick portion and protruding from the resin package, the protruding portion having a portion of the second surface of the cathode terminal.

25. The solid electrolytic capacitor of claim 24, wherein the protruding portion of the cathode terminal extends along an exterior surface of the resin package.

26. The solid electrolytic capacitor of claim 5, wherein the resin package has a recess therein in which the protruding portion of the cathode terminal is positioned.

27. The solid electrolytic capacitor of claim 22, wherein the cathode terminal further includes a protruding portion extending from the second portion of the second thick portion and protruding from the resin package, the protruding portion having the second surface of the cathode terminal.

28. The solid electrolytic capacitor of claim 27, wherein the protruding portion of the cathode terminal extends along an exterior surface of the resin package.

29. The solid electrolytic capacitor of claim 28, wherein the resin package has a recess therein in which the protruding portion of the cathode terminal is positioned.

30. A method of manufacturing a solid electrolytic capacitor, comprising:
  providing a capacitor element which includes
    an anode body made of valve metal having a rough surface,
    a dielectric oxide layer provided on the surface of the anode body,
    a resist having an insulating property provided on the dielectric oxide layer, the resist dividing the anode body and the dielectric oxide layer into a cathode portion and an anode portion,
    a solid electrolyte layer made of conductive polymer provided on the dielectric oxide layer at the cathode portion, and
    a cathode layer provided on the solid electrolyte layer;
  joining the anode portion of the capacitor element to an anode lead frame;
  joining the cathode layer of the capacitor element to a cathode lead frame;
  providing an anode terminal having a flat plate shape having a first surface and a second surface opposite to the first surface of the anode terminal, the anode terminal including a first thick portion and a first thin portion thinner than the first thick portion, the first thick portion having the second surface of the anode terminal and a portion of the first surface of the anode terminal, the first thin portion having a portion of the first surface and being connected to the first thick portion;
  providing a cathode terminal having a flat plate shape having a first surface and a second surface opposite to the first surface of the cathode terminal, the second surface of the cathode terminal being flush with the second surface of the anode terminal, the cathode terminal including a second thick portion and a second thin portion thinner than the second thick portion, the second thick portion having the second surface of the cathode terminal and a portion of the first surface of the cathode terminal, the second thin portion having a portion of the first surface and being connected to the second thick portion;
  joining the anode lead frame onto the first surface of the anode terminal;
  joining the cathode lead frame onto the first surface of the cathode terminal; and
  accommodating the capacitor element, the anode terminal, the cathode terminal, the anode lead frame, and the cathode lead frame in a resin package having an insulating property, the second surface of the anode terminal and the second surface of the cathode terminal exposing to an outside of the resin package,
  wherein said joining the anode lead frame onto the first surface of the anode terminal comprises joining the anode lead frame to the first thin portion of the anode terminal.

31. The method of claim 30, further comprising:
  providing another capacitor element including another anode portion and another cathode layer; and
  stacking the another capacitor element on the capacitor element,
  wherein said joining the anode portion of the capacitor element to the anode lead frame comprises joining the anode portion of the capacitor element and the another anode portion of the another capacitor element unitarily to the anode lead frame, and
  wherein said joining the cathode layer of the capacitor element to the cathode lead frame comprises joining the cathode layer of the capacitor element and the another cathode layer of the another capacitor element unitarily to the cathode lead frame.

32. The method of claim 30, further comprising
  forming a substrate having the anode terminal and the cathode terminal by etching a metal plate,
  wherein said providing the anode terminal comprises removing the anode terminal from the substrate, and
  wherein said providing the cathode terminal comprises removing the cathode terminal from the substrate.

33. The method of claim 30, wherein said joining the cathode lead frame onto the first surface of the cathode terminal comprises joining the cathode lead frame to the second thin portion of the cathode terminal.

34. The method of claim 30, wherein said accommodating the capacitor element, the anode terminal, the cathode terminal, the anode lead frame, and the cathode lead frame in the resin package comprises accommodating the capacitor element, the anode terminal, the cathode terminal, the anode lead frame, and the cathode lead frame in the resin package to allow the first thick portion of the anode terminal to have a protruding portion protruding from the resin package, said method further comprising
  bending the protruding portion of the anode terminal along an exterior surface of the resin package.

35. The method of claim 34, further comprising
  providing a recess in the resin package,
  wherein said bending the protruding portion of the anode terminal along the exterior surface of the resin package comprises positioning the protruding portion in the recess of the resin package.

36. The method of claim 30, wherein said accommodating the capacitor element, the anode terminal, the cathode terminal, the anode lead frame, and the cathode lead frame in the resin package comprises accommodating the capacitor element, the anode terminal, the cathode terminal, the anode lead frame, and the cathode lead frame in the resin package to allow the second thick portion of the cathode terminal to have a protruding portion protruding from the resin package, said method further comprising
  bending the protruding portion of the cathode terminal along an exterior surface of the resin package.

37. The method of claim 36, further comprising
  providing a recess in the resin package,
  wherein said bending the protruding portion of the cathode terminal along the exterior surface of the resin package comprises positioning the protruding portion in the recess of the resin package.

* * * * *